(12) United States Patent
Klein

(10) Patent No.: US 9,946,625 B2
(45) Date of Patent: Apr. 17, 2018

(54) DIAGNOSTIC TOOL AND METHOD FOR EFFICIENT SOFTWARE DEVELOPMENT

(71) Applicant: New Iron Systems, Inc., Austin, TX (US)

(72) Inventor: Janelle Marie Klein, Austin, TX (US)

(73) Assignee: New Iron Group, Inc., Austin, TX (US)

( * ) Notice: Subject to any disclaimer, the term of this patent is extended or adjusted under 35 U.S.C. 154(b) by 0 days.

(21) Appl. No.: 15/073,603

(22) Filed: Mar. 17, 2016

(65) Prior Publication Data
US 2016/0274995 A1  Sep. 22, 2016

Related U.S. Application Data

(60) Provisional application No. 62/135,097, filed on Mar. 18, 2015.

(51) Int. Cl.
*G06F 9/44* (2006.01)
*G06F 11/36* (2006.01)
*G06F 11/34* (2006.01)

(52) U.S. Cl.
CPC ...... *G06F 11/3608* (2013.01); *G06F 11/3664* (2013.01); *G06F 11/3419* (2013.01); *G06F 11/3438* (2013.01)

(58) Field of Classification Search
CPC .................................................. G06F 11/3608
USPC ................ 717/101–108, 124–126, 120–122
See application file for complete search history.

(56) References Cited

U.S. PATENT DOCUMENTS

| | | | | |
|---|---|---|---|---|
| 5,594,663 A | * | 1/1997 | Messaros | G05B 19/0426 700/9 |
| 6,016,474 A | * | 1/2000 | Kim | G06F 11/3664 709/224 |
| 6,026,362 A | * | 2/2000 | Kim | G06F 11/3664 705/317 |
| 6,289,502 B1 | * | 9/2001 | Garland | G06F 8/20 714/E11.218 |

(Continued)

OTHER PUBLICATIONS

Wang et al, "Diagnosing Software Using Statecharts", ACM, pp. 298-312, 2010.*

(Continued)

*Primary Examiner* — Anil Khatri
(74) *Attorney, Agent, or Firm* — J. Roger Williams, Jr.

(57) ABSTRACT

Disclosed is a computer-implemented software development diagnostic tool for improving the efficiency of software development. The computer-implemented software development diagnostic tool implements a state machine including learning, troubleshooting, and reworking states, records time elapsed in each state, and produces annotated timeline data. Also disclosed is a method of collecting software development diagnostic data, in which a computer-implemented software development diagnostic tool is used to select and track time spent in learning, troubleshooting, and reworking states of software development activity. Also disclosed is a method of detecting inefficiencies in software development, comprising producing diagnostic data using a computer-implemented software development diagnostic tool, displaying the diagnostic data, and detecting in the diagnostic data a problem pattern of developer activity.

18 Claims, 21 Drawing Sheets

(56) References Cited

U.S. PATENT DOCUMENTS

| | | | | |
|---|---|---|---|---|
| 6,314,555 B1* | 11/2001 | Ndumu | G06F 8/10 | 706/49 |
| 6,324,496 B1* | 11/2001 | Alur | G06F 11/3608 | 703/17 |
| 6,698,016 B1* | 2/2004 | Ghizzoni | G06F 9/4426 | 712/E9.083 |
| 6,874,680 B1* | 4/2005 | Klaus | G06F 8/65 | 235/375 |
| 6,959,432 B2* | 10/2005 | Crocker | G06F 8/10 | 714/38.1 |
| 7,103,876 B1* | 9/2006 | Lopez | G06F 11/3612 | 717/108 |
| 7,380,172 B2* | 5/2008 | Srinivas | G06F 11/079 | 714/47.1 |
| 7,526,750 B2* | 4/2009 | Andrews | G06F 11/3608 | 707/999.103 |
| 7,661,094 B2* | 2/2010 | Blevin | G06F 11/3476 | 717/128 |
| 8,141,040 B2* | 3/2012 | Chaar | G06F 8/36 | 717/101 |
| 8,296,719 B2* | 10/2012 | Chaar | G06Q 10/00 | 700/95 |
| 8,539,438 B2* | 9/2013 | Bassin | G06Q 10/00 | 717/101 |
| 8,646,205 B2* | 2/2014 | Cho | A01G 9/025 | 47/66.6 |
| 8,856,724 B2* | 10/2014 | Somani | G06F 8/30 | 717/101 |
| 8,909,990 B2* | 12/2014 | Davis | G06F 11/3636 | 714/37 |
| 9,477,444 B1* | 10/2016 | Shen | G06F 8/20 | |
| 9,612,939 B2* | 4/2017 | Davis | G06F 11/366 | |

OTHER PUBLICATIONS

Dillon, "Diagnosing Degenerate Forms in Software", ACM, pp. 9-11, 2014.*

Ivanova et al, "Schematic Diagram Editor and Simulator on Reliability and Diagnostics of Computer Systems", ACM, pp. 583-589, 2011.*

Zhang et al, "Proactive Detection of Inadequate Diagnostic Messages for Software Configuration Errors", ACM, pp. 12-23, 2015.*

Prähofer et al, "Detection of High-Level Execution Patterns in Reactive Behavior of Control Programs", ACM, pp. 14-19, 2010.*

Elmqvist et al, "Exploiting Model Graph Analysis for Simplified Modeling and Improved Diagnostics ", ACM, pp. 7-14, 2016.*

Wu et al, "Diagnosing Missing Events in Distributed Systems with Negative Provenance", ACM, pp. 383-394, 2014.*

* cited by examiner

710

| # | Start | End | Edge | Description |
|---|---|---|---|---|
| 1 | *start* 601 | P 610 | 602 | Begin a task in the Progress state |
| 2 | P 610 | *end* 690 | 612 | Close a task from the Progress state |
| 3 | P 610 | C 620 | 614 | Unexpected behavior detected while progressing |
| 4 | C 620 | P 610 | 614 | Unexpected behavior resolved |
| 5 | P 610 | L 630 | 616 | Progress postponed due to learning |
| 6 | L 630 | P 610 | 616 | Learning complete, progress continues |
| 7 | P 610 | R 640 | 618 | Progress postponed due to rework (refactoring) |
| 8 | R 640 | P 610 | 618 | Refactoring complete, progress continues |

Fig. 7a

| # | Start | End | Edge | Description |
|---|---|---|---|---|
| 9 | C 620 | L 630 | 622 | Learning required to resolve conflict ("Back to the drawing board") |
| 10 | C 620 | R 640 | 624 | Fix (rework) implementation problem |
| 11 | L 630 | R 640 | 632 | Learning complete, new strategy rework ensues |
| 12 | R 640 | L 630 | 632 | New strategy rework complete, learning ensues |

| # | Start | End | Edge | Description |
|---|---|---|---|---|
| 13 | L 630 | NCL 650 | 634 | Strategy conflict detected, new conflict nested in learning state |
| 14 | NCL 650 | L 630 | 634 | Strategy conflict resolved, back to learning |
| 15 | NCL 650 | C 620 | 652 | Conflict unnested from learning state, new trial begins in "trial and error" sequence |
| 16 | R 640 | NCR 660 | 642 | Implementation conflict detected during refactoring, new conflict nested in rework state |
| 17 | NCR 660 | R 640 | 642 | Implementation conflict resolved, back to refactoring |
| 18 | NCR 660 | C 620 | 682 | Conflict unnested from rework state, new trial begins in "trial and error" sequence |

Fig. 7c

Conflict Details — 1400

- Question: What caused the null pointer error? — 1410
- Cause: Uninitialized list field in class Student. — 1420
- Mistake type: Copy-Edit Mistake ▼ — 1430
- Resolution: Initialize all fields in class. — 1440
- Duration: 3 minutes — 1450
- Tags: #missingUnitTest — 1460
- [Done] — 1470

Fig. 14

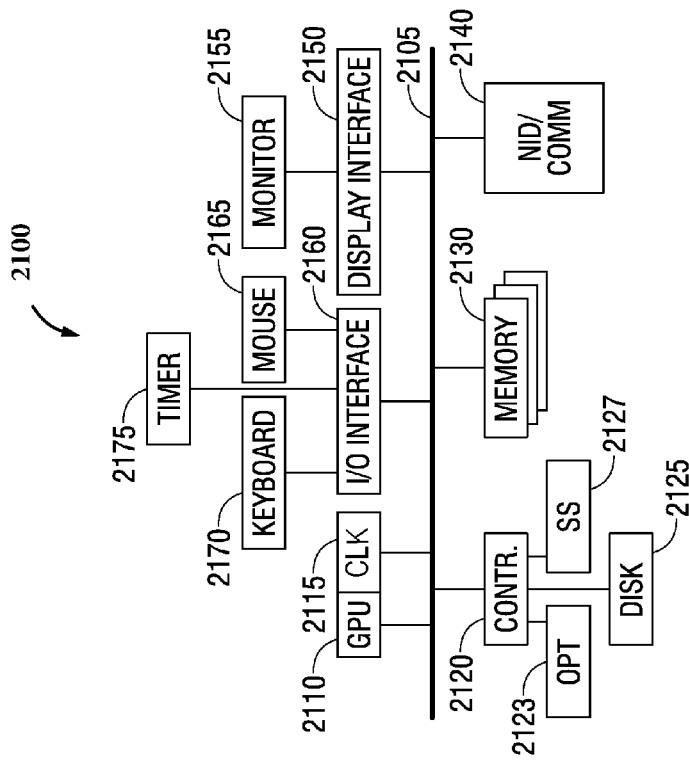
FIG. 21
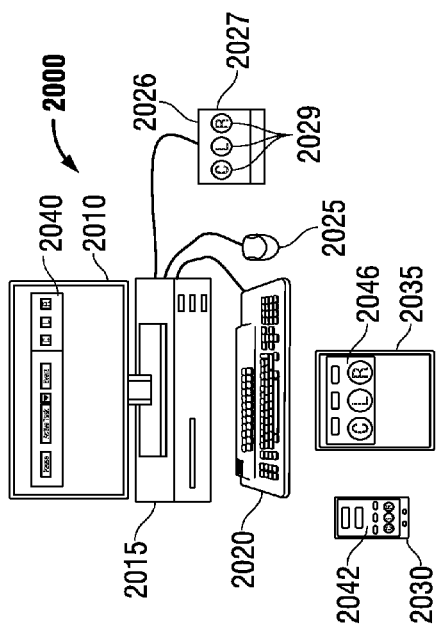
FIG. 20a
FIG. 20b

DIAGNOSTIC TOOL AND METHOD FOR EFFICIENT SOFTWARE DEVELOPMENT

CROSS-REFERENCE TO RELATED APPLICATIONS

This application claims the benefit of U.S. Provisional Application No. 62/135,097, filed on 18 Mar. 2015, which is hereby incorporated by reference in its entirety.

BACKGROUND OF THE INVENTION

Field of the Invention

The field of the invention is software engineering.

Information technology has literally revolutionized human society in the last several decades, arguably with as much historical impact as the Industrial Revolution. The power and speed of networked computing systems, their application in all walks of life, and their ability to scale from implanted devices to supercomputing clusters signals a pervasiveness that we are only beginning to comprehend.

The software that runs on these computing systems provides most of their utility, but software design, development and deployment is still an art that we have not yet mastered. Software projects are often plagued with delays and cost overruns, and when they are delivered, the systems often do not meet requirements, experience runtime errors, and even fail catastrophically. The initial rollout of healthcare.gov is a case in point, as are the continuous security breaches of personal, commercial, governmental and military systems.

At least as far back as the 1968 NATO conference that gave credence to the term "software crisis" we have been grappling with the problem of producing quality software in a cost effective, timely manner. Over the years, many remedies have been proposed including new programming languages, concepts and architectures; new development, deployment and test tools; new programming and test methodologies; new ways to share code; and new management and organizational structures. Research in all these areas has improved software and our ability to produce it, but the demand for new and more complex software in diverse domains far outstrips our ability to uniformly and predictability create it.

Common approaches to improving software development include conforming to programming best practices; chipping away at technical debt; improving test coverage; automating build, test and deployment; and a myriad of other technology-centric solutions. Though each of these approaches has merit, they only focus on changing code or the coding environment. Other approaches, such as pair programming or agile programming, concern themselves with how developers and development teams organize themselves. These methodologies can also improve software output. By only focusing on technologies and organization, however, we miss an opportunity to glean knowledge directly from developer experiences. The difficulties developers encounter on a daily basis limit their effectiveness and productivity, and these factors ultimately determine the cost and quality of a software product.

BRIEF SUMMARY

Disclosed is a computer-implemented software development diagnostic tool for improving the efficiency of software development. The computer-implemented software development diagnostic tool implements a state machine including learning, troubleshooting, and reworking states, tracks and records time elapsed in each state, and produces annotated timeline data. Also disclosed is a method of collecting software development diagnostic data, in which a computer-implemented software development diagnostic tool is used to select and track time spent in learning, troubleshooting, and reworking states of software development activity. Also disclosed is a method of detecting inefficiencies in software development, comprising producing diagnostic data using a computer-implemented software development diagnostic tool, displaying the diagnostic data, and detecting in the diagnostic data a problem pattern of developer activity.

BRIEF DESCRIPTION OF FIGURES

FIG. 7a shows an exemplary table of non-linking and non-nesting state machine transitions.

FIG. 7b shows an exemplary table of linking state machine transitions.

FIG. 7c shows an exemplary table of nesting and unnesting state machine transitions.

FIG. 14 illustrates an exemplary display of annotations associated with a state.

FIGS. 20a and 20b illustrate exemplary computer systems for use in implementing embodiments of diagnostic tools, systems, apparatus, and methods for efficient software development.

FIG. 21 is a block diagram illustrating exemplary components of a computer system.

DETAILED DESCRIPTION

Figure 1:
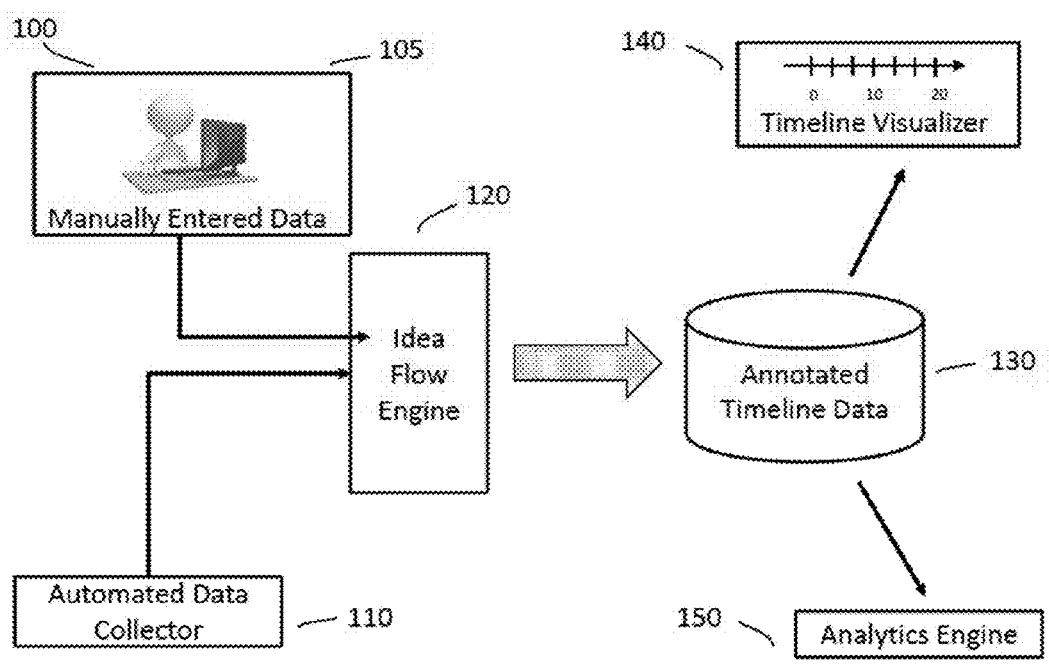
FIG. 1 shows how the main components of an exemplary Idea Flow system relate to each other.

This application discloses a diagnostic tool and method for continuous improvement of the software development process by examining, tracking and learning directly from developer experience. An advantage of this approach is its unobtrusive integration into daily tasks performed by developers and the ability to use the data collected to make software development more efficient. The invention can be incorporated into existing Integrated Development Environments (IDEs) or, more generally, into any Software Development Platform (SDP).

Described herein are specific applications of the concept of using time-tracking software to improve efficiency of software development by recording the total duration of time spent on each software task and analyzing how the developer spent her time. Many other applications of this concept are possible. For example, time tracking software can be integrated into a developer's IDE/SDP environment to automatically measure how much time the developer spends coding per file, per task, and to provide a dashboard to summarize the data. Time-tracking software can be used to track time against specific projects or issues in a ticketing system. Time-tracking software can be used to query the developer at predetermined intervals to determine what the developer is working on, and can then aggregate the developer's responses to show how many intervals were spent on each type of activity.

Embodiments of the present invention address the problems of software quality and efficient development by focusing on the human developer rather than on software artifacts and tools. At the root of the development process, a person must understand what they need to do, how to do it, and how to validate that it's done. Ultimately, the ideas in a developer's mind needs to be expressed in an executable programming language. One can imagine a communication path between the developer and the software as the software takes shape, not unlike that of a musician and his instrument as he experiments with new sounds or phrases during composition.

This conversation between a human developer and software is called an idea flow. Ideas are imparted from a person to software being developed through coding. We determine if the software understood the communication by running tests and reviewing the results. If the software doesn't say anything unexpected, the communication is deemed successful. If the software says something unexpected, the communication failed in some way and needs to be fixed.

When software development is viewed as a continuous process of reconciling differences in ideas between the mind of the developer and the software, the focus turns to the developer. Where are developers spending their time during this idea flow? When do mistakes occur and how did the communication fail? What categories of mistakes are there and what aspect of communication to give rise to them? Which mistakes are most common, which are most costly?

An advantage of this approach is that by using a tracking mechanism and state machine it is becomes possible to learn and analyze how developers spend their time and how efficient the idea flow is between developer and software. This information can be related to the quality and costs of the resultant software. Using a methodology based on confirmation and conflict loops, a mistake model and a way to visualize developer experience, it becomes possible to analyze the causes of mistakes and feed this information back into the development process. The goal is to increase the quality of the software and decrease the cost of development by fixing problems experienced by developers.

In an embodiment, the mechanism used to track developer experience comprises a user interface with three buttons that represent states. In an embodiment, a graphical user interface is used to implement the state-selection buttons, the "pressing" and "releasing" of the state-selection buttons, and the display of the state selection information. A developer indicates a Learning State by pressing the Learning button (displayed in an embodiment in blue) when she is researching a new task or assignment or performing other learning activity. The Learning button is released when she settles on an approach and begins writing code to implement her solution. After finishing some or all of the implementation, she runs validation tests to determine if the implementation meets requirements.

If validation succeeds, the learn/implement/test sequence is called a confirming loop and is repeated until the task is complete. If validation fails at any point, she indicates a Troubleshooting (or Conflict) State by pressing the Conflict button (displayed in an embodiment in red) and begins to debug the problem or perform other problem-analysis or troubleshooting activity. After settling on a remedy, she indicates a Reworking State by pressing the Rework button (displayed in an embodiment in yellow) to indicate that she is fixing a problem or performing other reworking, redoing, reprogramming, refactoring, or remediation activity. This test/troubleshoot/rework cycle is called a conflict loop and is repeated until the implementation meets expectations. At some point, all tests will succeed, the implementation will be complete, and the task can be closed.

Embodiments include two other potential states. One potential state is Idle, which preferably represents the time interval when the developer is idle or inactive. For example, the system may go into idle state after a defined interval of time (which may be adjusted) with no keystrokes or other developer input. Another potential state is Progress, which in an embodiment can be defined as the time interval when the system is not idle and when no state buttons are pushed, meaning that the developer is not in a Conflict, Learning, or Rework state.

The exemplary state names in the embodiments disclosed herein—Learning, Troubleshooting (or Conflict), Reworking (or Rework), Idle, and Progress—generally describe, characterize, or correlate to the primary types of activity associated with or performed during the state. Different state-names or labels may be used for these states, and additional or other states may be implemented, without departing from the spirit and scope of the invention.

Developers can annotate their tasks at any time and are prompted to do so when changing states. These annotations, in an embodiment, take the form of key/value pairs. In some embodiments, keys with no values are also used to annotate tasks. Such keys are often identified using a naming convention, such as one that requires keys to start with a hash character (#). These valueless types of annotations are called tags. In general, annotations provide documentation helpful during review and analysis.

In addition to recording manually-entered information, embodiments of the idea flow system automatically record time data, including preferably start and stop times of each state in a task using, in an embodiment, the system clock provided by a computer system. The start time for a state preferably corresponds to the time that a state was selected or entered, either by the developer or automatically. The stop time for a state preferably corresponds to the time of the transition to another state; and the transition to another state in an embodiment includes transitions directed by the developer by selecting another state or deselecting the current state, state transitions enforced by the state machine, or state transitions automatically made by the idea flow system (for example, an idle state or progress state).

The time data preferably is recorded to memory or other data store. In an embodiment the idea flow system automatically stores time data in memory during performance of the task, automatically stores time data to a data store during performance of the task, and automatically stores time data to the data store when the developer indicates that the task is completed or development activity is ended. In an embodiment, the idea flow system automatically stores time data to the data store at other times, for example, when a modified source code file is saved or committed to a source code depository. In addition to time data, annotations and other software development data collected by or entered into the idea flow system during the software development activity are also recorded in persistent storage, at the same time as time data or at different times.

An aspect of the idea flow system is that any time instant or time interval can be annotated by developers as they work. The annotations can be custom key and tags or they come from a set of well-known tags that have a predefined meaning to the idea flow system. For example, the system automatically detects and annotates idle time intervals. The visualization subsystem detects idle tags and collapses those intervals by default.

Other examples of annotations are those used to track and analyze mistakes. These keys in an embodiment include Conflict, Resolution, Cause and Mistake Type. The Conflict key describes the unexpected behavior that was observed; the Resolution key describes the fix for the problem; the Cause key names the failing component; and the Mistake Type categorizes the type of problem. Categories of Mistakes include modeling and execution.

Modeling mistake types indicate developer misunderstanding. Modeling mistakes include, but are not limited to, Scanning errors (when developers misread code), Visual Ambiguity (when developers misinterpret code because is it poorly organized), Unexpected Dependency (when developers violate a hidden or undocumented dependency), and Unexpected Requirements (when modified code breaks an undocumented requirement).

Execution mistake types indicate that the developer understood the problem, but still made a mistake during implementation. Execution mistakes include, but are not limited to, Copy/Edit (typos, improperly applied global edits, etc.), Transposition (improperly ordered arguments or conditions), Tedious Change (improperly applied repetitive changes), and Failed Refactor (inadvertent behavior change after refactoring).

The idea flow analysis engine can use mistake annotations to quantify the difficulties developers experience and point to the root causes of those difficulties. At a coarse grain level, the prevalence of modeling mistakes might indicate that the code is difficult to understand or that developers are not spending enough time analyzing the code. At a finer grain level, the analysis engine can correlate mistake types and failing components to quantify the cost of maintaining hot spots in the code. Trend analysis over multiple tasks also can be used to isolate root causes.

Embodiments of the invention are implemented as part of an Integrated Development Environment (IDE). An IDE is a computer-implemented software application that provides comprehensive facilities for software development. Eclipse®, IntelliJ® and NetBeans® are examples of IDEs that include source code editors, compilers, interpreters, debuggers, test automation tools, source code repository access, and other facilities used by developers. When incorporated into an IDE, embodiments enable the automatic collection of various types of data as the developer works. For example, an embodiment can track which files were viewed or modified during development, which areas of code were tested and the results of those tests, and how much time the developer spent viewing, modifying, or testing code during any time period. If a developer commits code to a source code repository, switches the working code branch, and deploys the application, these events can be automatically tracked as well. Embodiments can be integrated into an IDE by utilizing programmable APIs provided by the IDE for monitoring a wide variety of developer activity.

In other embodiments, the present invention can be incorporated into any type of Software Development Platform (SDP). An SDP may include text editors with plugin capabilities or any other software application or combination of software applications can be used by a software developer to some, all, or any of the functions associated with development of software, including writing, deriving, authoring, creating, designing, annotating, editing, modifying, revising, interpreting, archiving, curating, assembling, compiling, running, executing, linking, testing, or debugging source code or software artifacts. In an embodiment, the invention can be implemented as a standalone software application unto itself.

In yet another aspect of the invention, both the developer-created and the automatically-collected data can be processed through a visualization engine for display and interpretation by humans. In an embodiment, the engine's output is an annotated time series graph, an annotated graphic display of time series data, or an annotated timeline with time intervals that are color-coded (or shaded or otherwise distinguished) to provide state information, where time intervals can be nested and linked to each other.

In an embodiment, intervals are nested when a developer is performing an activity, such as a rework activity, and another problem surfaces causing the developer to enter the conflict state. The interval of time it takes to troubleshoot the new problem is nested within the original rework time interval. Different visualization engine embodiments may display this nesting relationship in different ways, such as with expandable tree widgets or with hyperlinks.

In an embodiment, intervals are linked when a developer is in the conflict state (i.e., the conflict button is pressed) and he or she presses the learning or rework button. The system automatically links the new state's interval back to the original conflict interval. If the new state is the learning state, then the link signifies a "back to the drawing board" activity; if the new state is the rework state, then the link signifies the rework to resolve the conflict. Different visualization engine embodiments may display linked time intervals in different ways, such as by using grouping, filtering, vectors or highlighting.

The idea flow system uses the data collected during development to analyze where developers spend time and to identify problem areas. The type, frequency, duration and other problem characteristics can be quantified and correlated across time, developers and even organizations. For instance, the observation that during troubleshooting a developer experiences many long learning periods, might suggest investigation to determine whether the cause is developer-specific or a pattern experienced more broadly. This investigation will determine the method of remediation, but the initial quantification is provided by the idea flow system. As another example, the observation that the troubleshooting time for bug fix tasks on one project is consistently longer than on another, might suggest investigation to determine the cause of this cross project disparity and then take appropriate action.

Embodiments of the idea-flow system, implemented with a computer system, as described herein, include a computer-implemented software development diagnostic tool for improving the efficiency of software development and which can be used to collect software development diagnostic data and to detect inefficiencies in software development.

Advantageous aspects of embodiments of the present invention include a tracking interface (or software development sensor) used by developers, a well-defined set of states that provide sufficient information for meaningful analysis, a state machine that restricts the legal transitions between activities, and the non-linear output that contains nested and linked time intervals. A user performing one activity may not be able to transition to certain other activities depending on the state of the system. For example, if the system is in the learning state, the user cannot transition the system directly to a conflict state or a rework state (by, for example, selecting the C or R button) but may instead transition into a link state or a nested state.

FIG. 1 depicts Idea Flow inputs and outputs of an exemplary Idea Flow system 100. Developer [100] manually enters state and annotation information into the system as he or she performs various software development tasks. In embodiments, an Automated Data Collector [110] monitors and automatically collects data about what the developer is doing at different points in time. Preferably manually-entered and automatically-collected data are fed into the Idea Flow Engine [120]. The Idea Flow Engine validates that all input data follows the allowed state transitions and produces Annotated Timeline Data [130] that may be persisted to a data store or permanent storage. The Timeline Visualizer [140] uses the Annotated Timeline Data [130] to display information concerning developer experience. The displayed information can be in the form of graphs, charts, tables, reports, web pages or any other format that provides insight into how developer time was spent.

Analytics Engine [150] uses the Annotated Timeline Data [130] to correlate timeline information with patterns of developer experience. The Analytics Engine can aggregate the Annotated Timeline Data from multiple developer experiences by correlating timeline data with other developer experience data, including, in an embodiment, one or more of similar tag names, similar tasks, similar areas of code (including the same or similar source code files), and similar patterns of mistakes, and adding up, aggregating, or correlating the amount of time spent on troubleshooting, learning, and rework in each area. Preferably the analyst can select which other developer experience data is used for aggregation and/or correlation. Exemplary dimensions for analyzing the data to see trends and/or overall trending patterns include: Aggregation by area of code (file-level tracking); aggregation by level of familiarity or skill level (human-oriented tracking); aggregation by task type or task difficulty (tasks with similar patterns of change (for example, "add a chart") grouped together); and aggregation of overall friction by type (for example, time spent in trouble-shooting or learning states) as a percentage of overall capacity (for example, where capacity is measured in deployed developer-hours). Proper correlation between the time bands and what files the problems are associated with increases the accuracy of the diagnostic advice. If an area shows a high amount of inefficiency or mistakes, or a trending increase in inefficiency or mistakes, Analytics Engine [150] can flag the area for review by the development team. The displayed information can be in the form of graphs, charts, tables, reports, web pages, or any other format that provides insight into the team's biggest causes of inefficiency and defects. The goal of the Analytics Engine is to detect the root causes of problems that developers encounter and to suggest ways to improve developer productivity.

Figure 2:
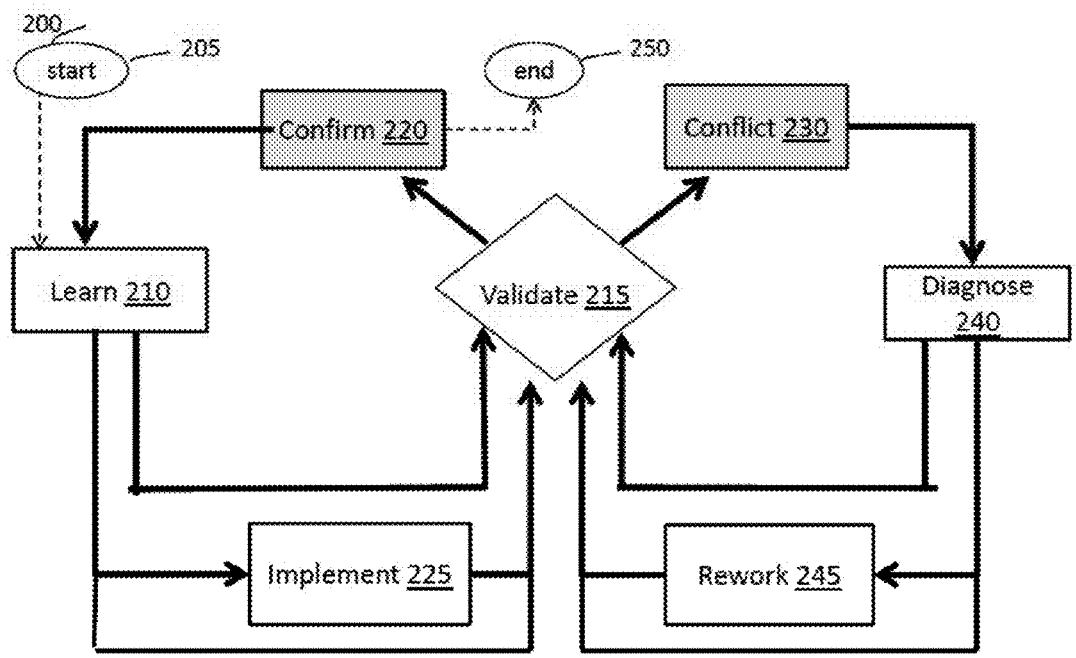
FIG. 2 illustrates an exemplary process by which developers solve software problems.

FIG. 2 illustrates an exemplary process 200 by which developers solve software problems, including exemplary Confirmation and Conflict Loops that developers mentally navigate while performing software development tasks. The Confirmation Loop [260] comprises the Learn [210], Implement [225], Validate [215], and Confirm [220] nodes. The Conflict Loop [270] comprises the Validate [215], Conflict [230], Diagnose [240] and Rework [245] nodes. Each node corresponds to a state (Progress, Learning, Conflict, Rework) against which developer time is tracked.

The process described in FIG. 2 begins when a developer initiates a task [205]. The developer starts by learning the task goals and requirements, by reading pertinent documentation, by looking at source code, by running tests, or by performing any other activity necessary to understand the task. During this initial learning period, the developer operates in the Learn node [210], which corresponds to the Learning state.

At some point, the developer determines if any software changes are needed. If so, the developer moves to the Implement node [225], which corresponds to the Progress state. Once the changes are made, or if no changes are needed, the developer moves next to the Validate node [215], which continues in the Progress state. Exemplary Validation activities include running tests or observing system behavior to evaluate whether the goals of the task have been achieved.

If validation activity confirms that the software is behaving as expected, the developer moves to the Confirm node [220], which maintains the Progress state. If all aspects of the task have been completed, the developer closes the task and moves to the End node [250]. If more work is needed, then the developer moves back to the Learn node [210] and the Confirmation Loop [260] processing repeats.

On the other hand, if the validation activity produces unexpected results, the developer moves to Conflict node [230], which corresponds to the Conflict state. While in the Conflict state, the developer moves to the Diagnose node [240] while troubleshooting the problem. At some point, the developer discovers a way to fix or avoid the problem. If the resolution requires code changes, then the developer moves to the Rework node [245], which corresponds to the Rework state. When the rework is finished, or if the resolution required no rework, the developer moves to the Validate node [215], which causes a switch to the Progress state.

The Validate node [215] leads into either the Confirmation Loop [260] or the Conflict Loop [270], repeating the processes and state changes discussed above.

Figure 3:
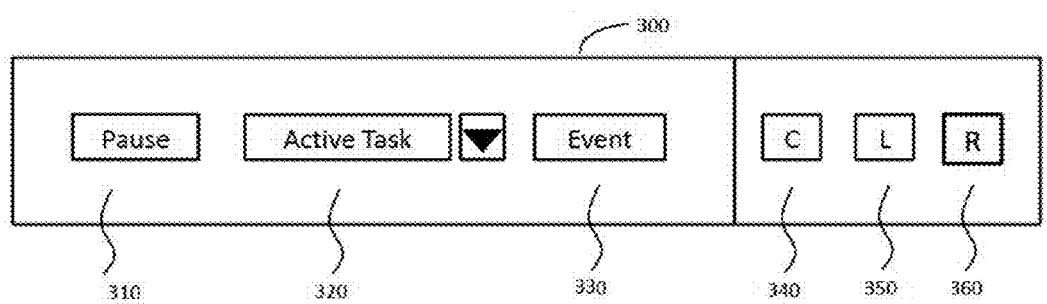
FIG. 3 shows an embodiment of a graphical user interface for developers.

FIG. 3 illustrates an embodiment of a graphical interface for a computer-implemented software development sensor [300]. The Pause button [310] allows time tracking to be temporarily interrupted. The Active Task dropdown menu [320] allows the developer to select a current task. The Event button [330] allows the developer to annotate an interval or instant of time. The Conflict [340], Learning [350] and Rework [360] state buttons can be toggled on and off to enter or exit a state, respectively. When no state buttons are pressed, time is being tracked against the Progress state.

In an embodiment, dropdown menu [320] allows the developer to select "New Task . . . " from the drop down menu, which prompts the user for a "taskId". The "taskId" can be a new task, or an existing task. The tool does a remote call to a "task server" that pulls the description information from the company's task management tool, such as JIRA, or Rally, then returns the corresponding task data to the client, or fails if the taskId is unknown. Once the developer adds a new task, the task is added to the developer's "working set", or list of active tasks. At any time, a developer can use the drop down to change their active task, which causes their prior task to stop and the new task to start. Alternatively, a developer can choose to remove their active task from the working set, which stops the active task. In an embodiment, the idea flow system tracks and records time data, state data, annotations, and software development data for each active task.

In an embodiment, there is no "multi-tasking" in the tool only "task-switching". A developer contributes their time to one active task or another and must explicitly switch between one task in their working set and another. Since task-switching is well known to be a defect-causing, productivity-wasting, behavior, the annoyance of having to manually switch tasks makes the developer keenly aware that she is actively following a well-discouraged behavior pattern.

Figure 4:
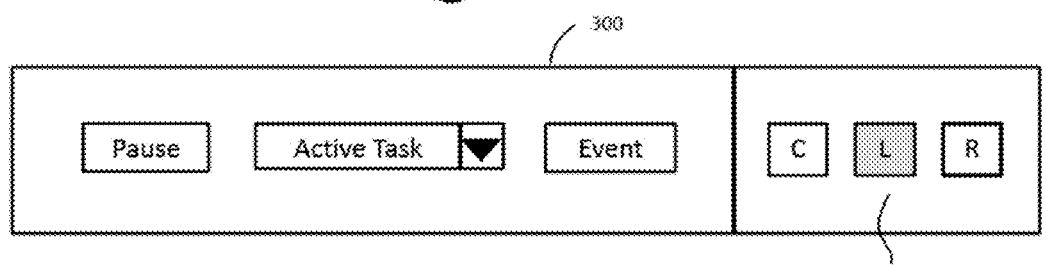
FIG. 4 shows another view of an embodiment of a graphical user interface for developers.

FIG. 4 shows another view of the embodiment of a tracking graphical interface [300] as shown in FIG. 3, but in this case the Learning button [410] is pressed and time is accumulating against the developer's Learning state.

Figure 5:
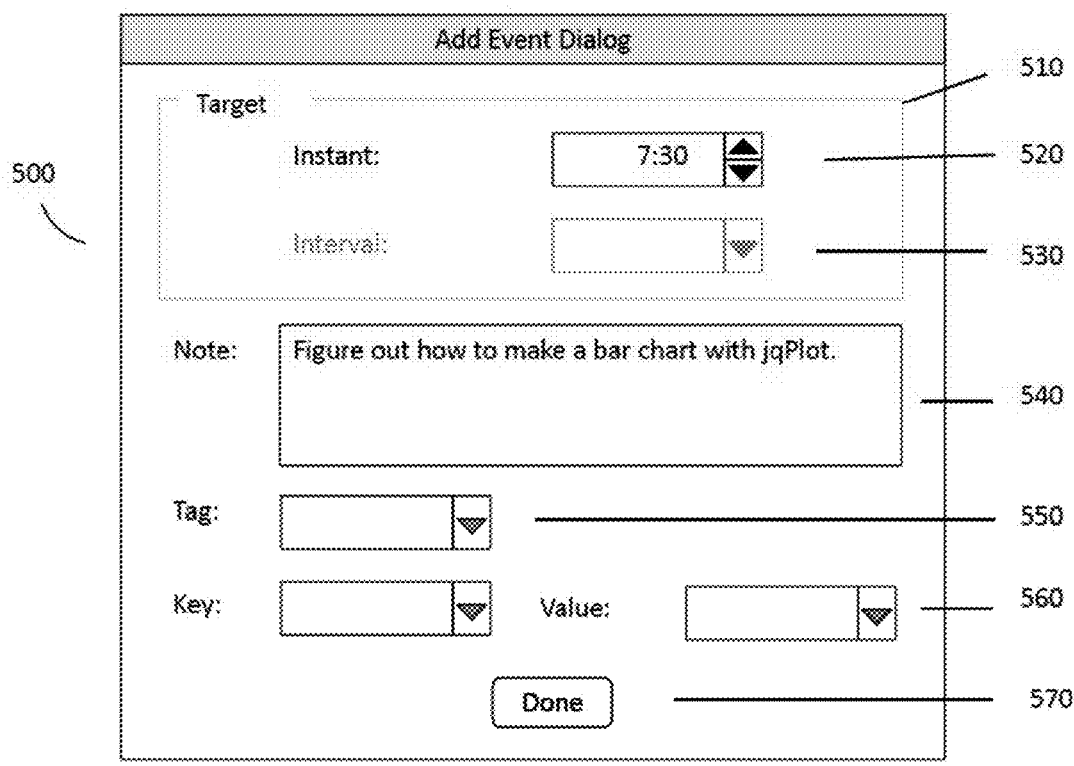
FIG. 5 shows how events are used to annotate instants and intervals of time in an embodiment.

FIG. 5 shows how events are used to annotate instants and intervals of time in an embodiment. Shown in FIG. 5 is an exemplary Add Event Dialog [500] that embodiments use to associate annotations to any time instant or interval. The Target area [510] allows a user to choose the annotation target, which in this case is the instant of time 7 minutes and 30 second since the task started [520]. The Interval option [530] is greyed out since an Instant was specified in this example. The user also entered descriptive text in the Note field [540]. Though not shown, a user can also associate Tags [550] or Key/Value pairs [560] with an event. Users may specify tags and key/value pairs from pre-defined lists or make them up on the fly depending on the implementation. When input is complete, the Done button [570] saves the event.

Figure 6:
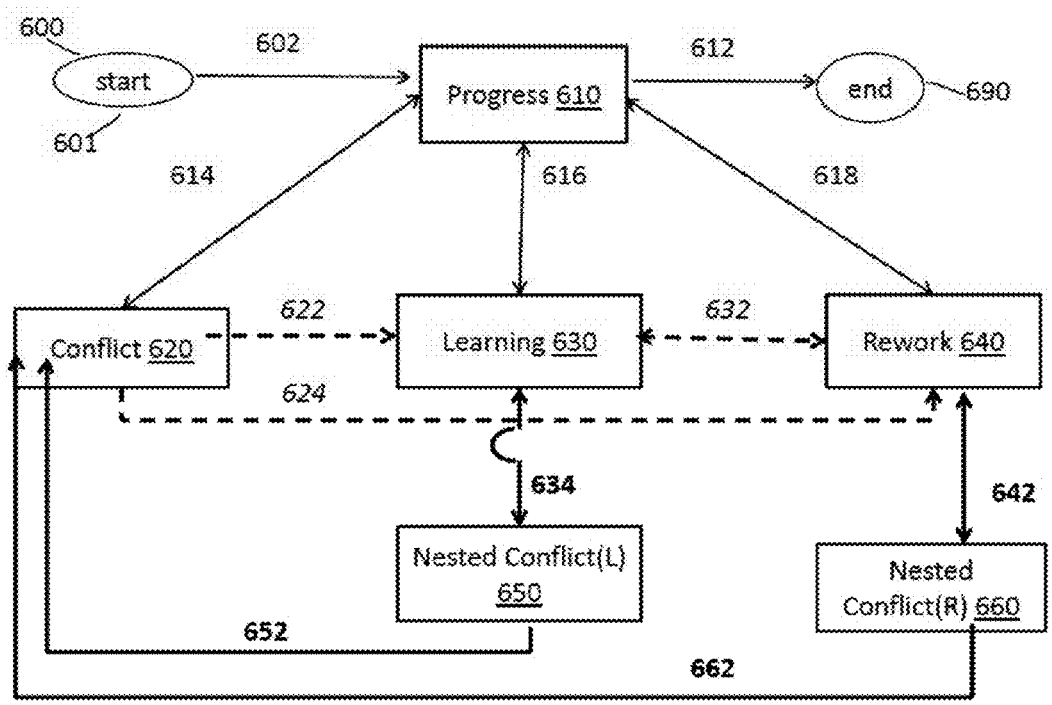
FIG. 6 shows an exemplary state machine corresponding to an exemplary Idea Flow Engine.

FIG. 6 shows an exemplary state machine 600 corresponding to the exemplary Idea Flow Engine [120] shown in FIG. 1. Three types of transitions (or edges) between nodes are shown. Edges in regular font ([602], [612], [614], [616], [618]) are state transitions that do not involve the linking or nesting of states. Edges in italics ([622], [624], [632]) link the destination state to the source state. Edges in bold font ([634], [642], [652], [662]) nest or unnest a conflict within another state. Note that some edges are unidirectional and some are bidirectional.

Developers begin tasks at the Start node [601] and immediately proceed to the Progress state [610] via edge [602]. Developers remain in the Progress state when they are actively writing the code that implements a feature or fixes a defect. When the feature or fix is complete, developers move from Progress state [610] to the end state [690] via edge [612].

Before a task is complete, developers can transition from Progress state [610] to any of the Conflict [620], Learning [630] or Rework [640] states.

The transition from Progress state [610] to Learning [630] via edge [616] signifies that a developer is thinking, analyzing, or formulating an implementation strategy. The Learning state preferably comprises activities such as reading source code, learning about libraries used in the code, understanding imported and exported interfaces, learning about system architecture and design, searching the Internet or other reference sources for helpful information, formulating a design, or any other non-coding work that lays the groundwork for writing code.

The transition from Learning [630] to Progress [610] via edge [616] signifies that a period of abstract thinking, analyzing and formulating activities is complete. A developer can write code while in the Progress state [610] or transition to another state.

The transition from Progress state [610] to Rework [630] via edge [618] signifies that a developer is reorganizing or refactoring code, but not actually writing code that adds or fixes the functionality required by the task. The refactoring associated with Rework state [630] prepares the code for a new feature or defect fix, but does not implement that feature or fix.

The transition from Rework [630] to Progress [610] via edge [616] signifies that a refactoring period is complete. A developer can write code while in the Progress state [610] or transition to another state.

The transition from Progress state [610] to Conflict [620] via edge [614] signifies that a developer encountered something unexpected. This encounter is often detected when the application behaves in unexpected ways. Developers investigate and diagnose problems while in the Conflict state [620]. From the Conflict state, one can transition to the Progress [610], Learning [630] or Rework [640] states.

The transition from Conflict [620] to Progress [610] via edge [614] signifies that a problem or potential problem has been resolved. As usual, a developer can write code while in the Progress state [610] or transition to another state.

The transition from Conflict [620] to Learning [630] via edge [622] signifies that the developer is rethinking his approach to the problem that caused the conflict. To resolve the conflict, the developer needs a new plan of attack or, more colloquially, he needs to "go back to the drawing board." By definition, the transition to Learning [630] from Conflict [620] indicates a strategy conflict. Examples of strategy conflicts include querying a database for data not stored there, using the wrong internal data structure to achieve a certain result, or using an external library in ways for which it was not designed. The Idea Flow Engine [120] automatically links the Learning time interval to the preceding Conflict time interval when a Conflict [620] to Learning [630] transition occurs.

The transition from Conflict [620] to Rework [640] via edge [624] signifies that the developer is fixing the problem that caused the conflict. The problem is an implementation conflict that does not require a change in strategy or design for resolution. Examples of implementation conflicts include typographical errors, a missing case clause in a multi-way conditional statement, or improper input validation. The Idea Flow Engine [120] automatically links the Rework time interval to the Conflict time interval when a Conflict [620] to Rework [640] transition occurs.

The transition from Learning [630] to Rework [640] via edge [632] indicates that a new strategy formulated while in the Learning state is now being implemented in the Rework state. The Idea Flow Engine [120] automatically links the Rework time interval to the Learning time interval when such a transition occurs.

The transition from Rework [640] to Learning [630] via edge [632] indicates that a rework implementation activity was interrupted to rethink or reconsider the current approach. The Idea Flow Engine [120] automatically links the Learning time interval to the Rework time interval when such a transition occurs.

The transition from Learning [630] to Nested Conflict(L) [650] via edge [634] signifies that during a learning period a strategy conflict was detected. For brevity, we refer to Nested Conflict(L) [650] as NCL [650]. An example of such a transition is when a developer is reading though source code and unexpectedly discovers a design problem such a race condition. Since a race condition could compromise application execution and data, resolving it often preempts any previous learning activity. In this event, the newly discovered conflict can be said to be nested within the Learning state [630]. The Idea Flow Engine [120] automatically nests the NCL time interval in the Learning time interval when a Learning [630] to NCL [650] transition occurs.

The transition from NCL [650] to Learning [630] via edge [634] signifies that the strategy conflict described in the previous paragraph has been resolved and the developer reverts back to learning activities.

The transition from NCL [650] to Conflict [620] via edge [652] signifies that the strategy conflict associated with NCL state [650] is no longer nested within Learning state [630]. This transition is called an unnesting operation. In this case, nesting means that the time interval of the new conflict of the NCL state [650] is nested within the time interval of the preceding Learning state [630]. When an unnesting operation occurs, the Idea Flow Engine [120] removes the nesting relationship and automatically links the Conflict [620] time interval to the Learning [630] time interval that preceded the NCL state [650].

The transition from Rework [640] to Nested Conflict® [660] via edge [642] signifies that a conflict was detected while refactoring code. For brevity, Nested Conflict® [660] is referred to as NCR [660]. An example of such a transition is when a developer is refactoring code and she notices that the program no longer works, i.e., the refactoring broke the code. This type of nested conflict is a validation conflict since it is an implementation problem. In this event, the newly-discovered conflict can be considered to be nested within the Rework state [640]. The Idea Flow Engine [120] automatically nests the NCR time interval in the Rework time interval when a Rework [640] to NCR [660] transition occurs.

The transition from NCR [660] to Rework [640] via edge [642] signifies that the validation conflict described in the previous paragraph has been resolved and the developer reverted to rework activities.

The transition from NCR [660] to Conflict [620] via edge [662] signifies that the validation conflict associated with NCR state [660] is no longer nested within Rework state [640]. This transition, like transition [652], is an unnesting operation. In this case, the time interval of the new Conflict is no longer nested within the time interval of Rework state [640]. When the unnesting operation occurs, the Idea Flow Engine [120] automatically links the Conflict [620] time interval to the Rework [640] time interval that preceded the NCR state [660].

Note that the diagram for state machine [600] does not show the Idle state, which in embodiments is automatically detected whenever the user is inactive. In embodiments, the Idea Flow Engine [120] accounts for idle time separately from time spent in other states. This accounting entails suspending time accumulation for any non-Idle state when the user is inactive and resuming time accumulation for that non-Idle state when the user becomes active again.

FIGS. 7a, 7b and 7c summarize the state transitions discussed above in regard to state machine [600]. Table 710 in FIG. 7a lists transitions that do not involve the linking or nesting of time intervals. Table 720 in FIG. 7b lists transitions that involve linking; and Table 730 in FIG. 7c lists those that involve nesting and unnesting. The tables in each figure contain a transition number, start state, end state, edge traversed and description columns, where the states and edges are those defined in state machine [600]. When referring to states, the abbreviations P, C, L and R indicate the Progress, Conflict, Learning and Rework states, respectively.

An embodiment of a graphical user interface (GUI) allows developers to initiate transitions in state machine [600] using three buttons: C (conflict or troubleshooting), L (learning) and R (rework). FIGS. 3 and 4 illustrate one such embodiment. In an alternative embodiment, a hardware-implemented accessory having a housing and physical push-buttons may be used to initiate transitions in state machine 600 or select or deselect states.

Figure 8:
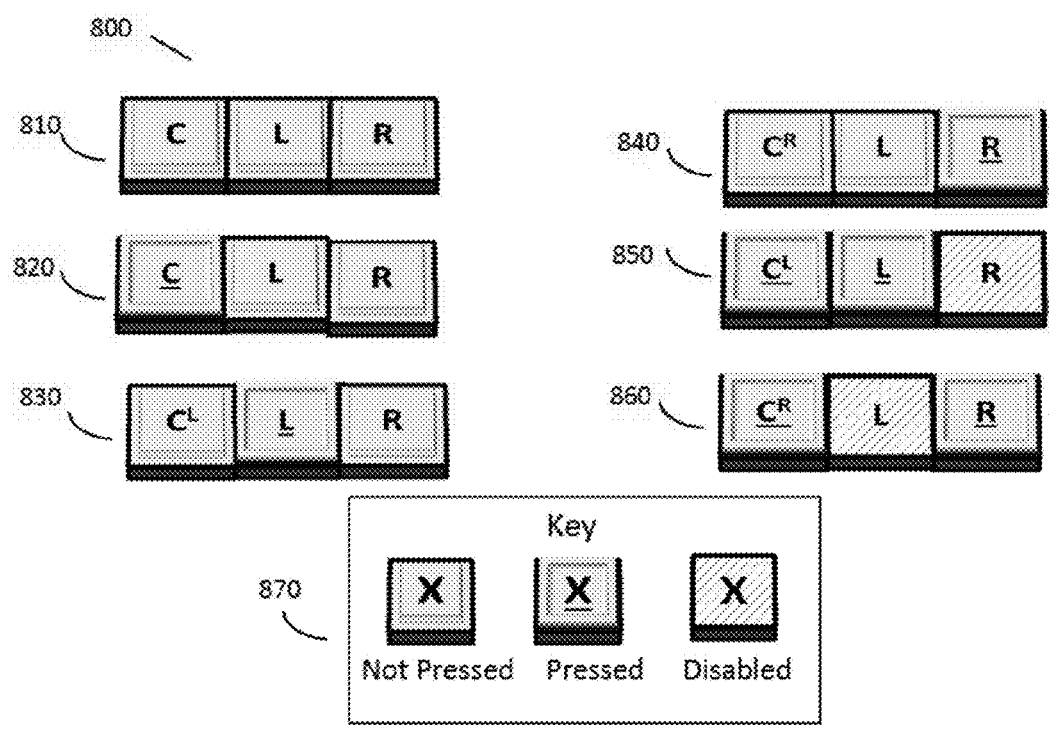
FIG. 8 shows exemplary user interface configurations associated with the state machine in an embodiment.

FIG. 8 shows different exemplary configurations 800 of a GUI in an embodiment. As shown in the Key [807], each button has three states: not pressed, pressed and disabled. For each transition in FIGS. 7a, 7b and 7c, an embodiment can associate a start and end GUI configuration. These configurations are referenced by their labels [810-860] as shown in FIG. 8. In the following paragraphs, GUI configurations defined in FIG. 8 are related to transitions listed in FIGS. 7a, 7b and 7c.

Referring now to FIG. 7a, transition 1 (start [601] to P [610]) starts and ends with GUI configuration [810]. This transition occurs when a user begins a task. Transition 2 (P [610] to end [690]) also starts and ends with GUI configuration [810], but in this case a user ends a task. Alternative embodiments may allow the end state to be reached from GUI configurations other than [810].

Transition 3 (P [610] to C [620]) starts with GUI configuration [810] and ends with configuration [820] when the user presses the C button. Transition 4 (C [620] to P [610]) starts with GUI configuration [820] and ends with configuration [810] when the user depresses (or releases) the C button.

Similarly, transition 5 (P [610] to L [630]) starts with GUI configuration [810] and ends with configuration [830] when the user presses the L button. Notice that on this transition the embodiment shown in FIG. 8 adds an L superscript to the Conflict button label (yielding $C^L$). Transition 6 (L [630] to P [610]) starts with GUI configuration [830] and ends with configuration [810] when the user depresses the L button. In this case, the superscript L is preferably removed from the Conflict button.

Similarly, transition 7 (P [610] to R [640]) starts with GUI configuration [810] and ends with configuration [840] when the user presses the R button. Notice that on this transition the embodiment shown in FIG. 8 adds a superscript R to the Conflict button label (yielding $C^R$). Transition 8 (R [640] to P [610]) starts with GUI configuration [840] and ends with configuration [810] when the user depresses the R button. In this case, the superscript R is preferably removed from the Conflict button.

Turning now to FIG. 7b, transition 9 (C [620] to L [630]) starts with GUI configuration [820] and ends with configuration [830] when the user presses the L button. Notice that on this transition the embodiment shown in FIG. 8 adds an L superscript to the Conflict button label (yielding $C^L$) and depresses the Conflict button. Additionally, the Idea Flow Engine [120] in embodiments automatically links the new learning time period to the prior conflict time period.

Continuing with FIG. 7b, transition 10 (C [620] to R [640]) starts with GUI configuration [820] and ends with configuration [840] when the user presses the R button. Notice that on this transition the embodiment shown in FIG. 8 adds a superscript R to the Conflict button label (yielding $C^R$) and depresses the Conflict button. Additionally, the Idea Flow Engine [120] in embodiments automatically links the new rework time period to the prior conflict time period.

Transition 11 (L [630] to R [640]) on FIG. 7b starts with GUI configuration [830] and ends with configuration [840] when the user presses the R button. Notice that on this transition the embodiment shown in FIG. 8 changes the superscript letter on the Conflict button label from L to R ($C^L$ to $C^R$). In embodiments, the Idea Flow Engine [120] automatically links the new rework time period to the prior learning time period.

Transition 12 (R [640] to L [630]) on FIG. 7b starts with GUI configuration [840] and ends with configuration [830] when the user presses the L button. Notice that on this transition the embodiment shown in FIG. 8 changes the superscript letter on the Conflict button label from R to L ($C^R$ to $C^L$). In embodiments, the Idea Flow Engine [120] automatically links the new learning time period to the prior rework time period.

Turning now to FIG. 7c, transition 13 (L [630] to NCL [650]) starts with GUI configuration [830] and ends with configuration [850] when the user presses the $C^L$ button. Notice that on this transition the embodiment shown in FIG. 8 disables the R button. Additionally, the Idea Flow Engine [120] preferably automatically nests the new conflict time period to the prior learning time period.

Transition 14 (NCL [650] to L [630]) starts with GUI configuration [850] and ends with configuration [830] when the user depresses the $C^L$ button. Notice that on this transition the embodiment shown in FIG. 8 enables the R button.

Transition 15 (NCL [650] to C [620]) starts with GUI configuration [850] and ends with configuration [820] when the user depresses the L button. Notice that on this transition the embodiment shown in FIG. 8 enables the R button. Also, the Idea Flow Engine [120] automatically unnests the conflict time period from the prior learning period and then links the conflict time period to the prior learning time period. In embodiments, the unnesting operation replaces the nested relationship with a link relationship.

Continuing with FIG. 7c, transition 16 (R [640] to NCR [660]) starts with GUI configuration [840] and ends with configuration [860] when the user presses the $C^R$ button. Notice that on this transition the embodiment shown in FIG. 8 disables the L button. Additionally, the Idea Flow Engine [120] preferably automatically nests the new conflict time period to the prior rework time period.

Transition 17 (NCR [660] to R [640]) starts with GUI configuration [860] and ends with configuration [840] when the user depresses the $C^R$ button. Notice that on this transition the embodiment shown in FIG. 8 enables the L button.

Transition 18 (NCR [660] to C [620]) starts with GUI configuration [860] and ends with configuration [820] when the user depresses the R button. Notice that on this transition the embodiment shown in FIG. 8 enables the L button. In embodiments, the Idea Flow Engine [120] automatically unnests the conflict time period from the prior rework period and then links the conflict time period to the prior rework time period. In embodiments, the unnesting operation replaces the nested relationship with a link relationship.

Figure 9:
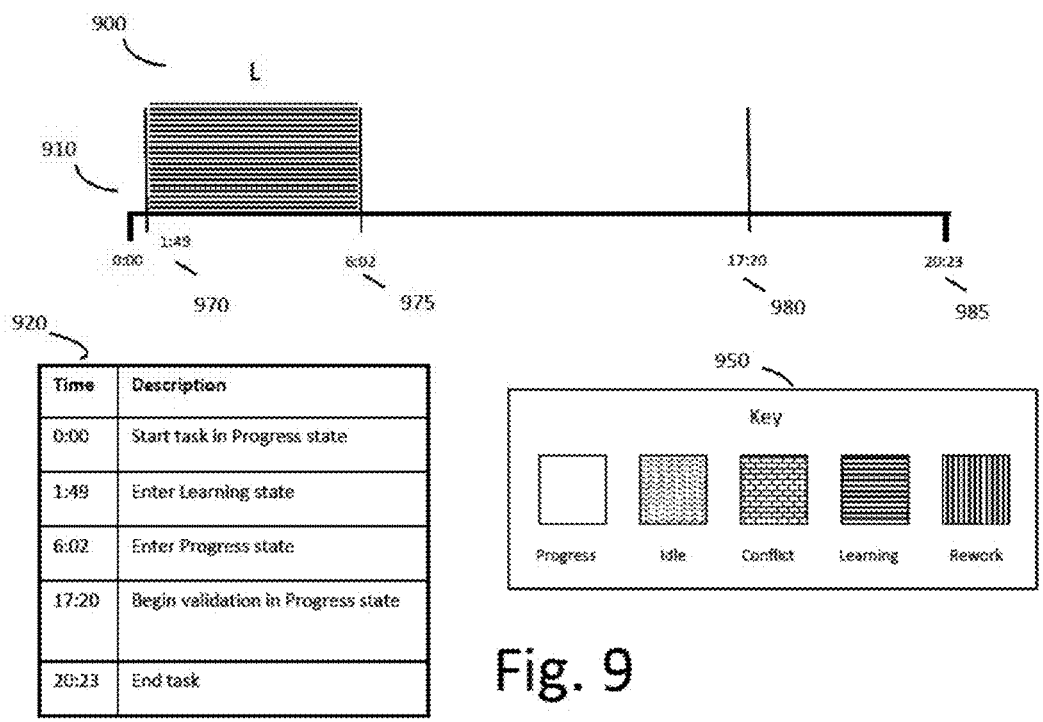
FIG. 9 shows a confirmation loop timeline.

FIG. 9 shows a graphical representation of a task's timeline 910. FIG. 1 indicates that Annotated Timeline Data [130] are outputted by the Idea Flow Engine [120]. The Timeline Visualizer [140] generates graphs, charts, tables and other formats suitable for human consumption from the timeline data. Timeline [910] in FIG. 9 is just one type of graphical output that an embodiment may produce. Those knowledgeable in the art will recognize that there are many ways to represent time series, state, and interval data in the Annotated Timeline Data [130] repository and many ways that a Timeline Visualizer [140] may output that information.

FIG. 9 defines Key [950] to indicate the user-controlled state assigned to each point in time. These states are defined in state machine [600] and correspond to the settings of the Conflict, Learning and Rework buttons, plus the automatically detected Idle state, as discussed above in conjunction with FIGS. 3, 4, 6 and 8.

Table [920] depicts key points in the life cycle of the task 900 shown in timeline [910]. Both the table and timeline show elapsed time in minutes:seconds format from the time the task begins. The table also describes activities and the timeline illustrates state at various points in time. For example, the task starts in the Progress state at time 0:00 and switches to the Learning state at time 1:49 (970). The developer returns to the Progress state at time 6:02 (975) and continues in that state until time 20:23 (985) when the task completes. At time 17:20 (980), the developer creates an event to document that validation is beginning. As such, timeline [910] represents a short task that traverses the Confirmation Loop [260] (seen in FIG. 2) one time.

Figure 10:
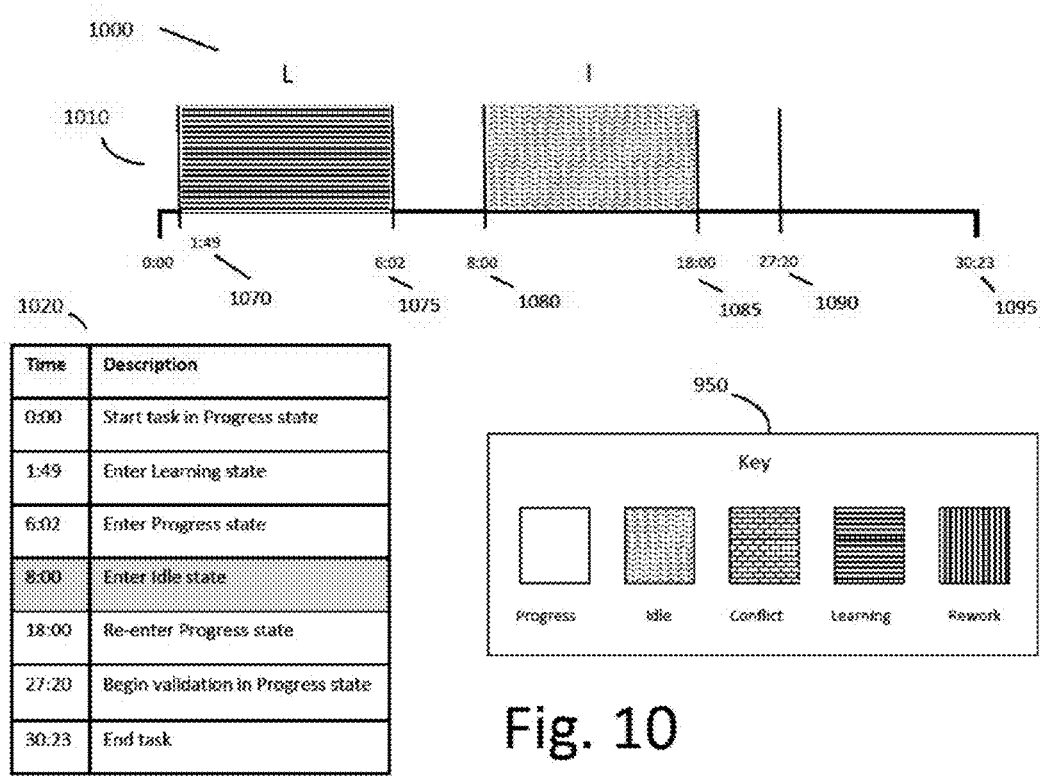
FIG. 10 shows a confirmation loop timeline with an Idle state.

Task 1000 shown in FIG. 10 is the same as task 900 illustrated in FIG. 9, but this time with a 10-minute Idle state inserted at time 8:00 (1080). Timeline [1010] and table [1020] both record the idle time. Those knowledgeable in the art will recognize that modern operating systems allow applications to detect periods of user inactivity. This capability allows the Idea Flow Engine [120] to recognize and record Idle states. Embodiments preferably allow the user to hide or expose Idle states in various outputs.

Figure 11:
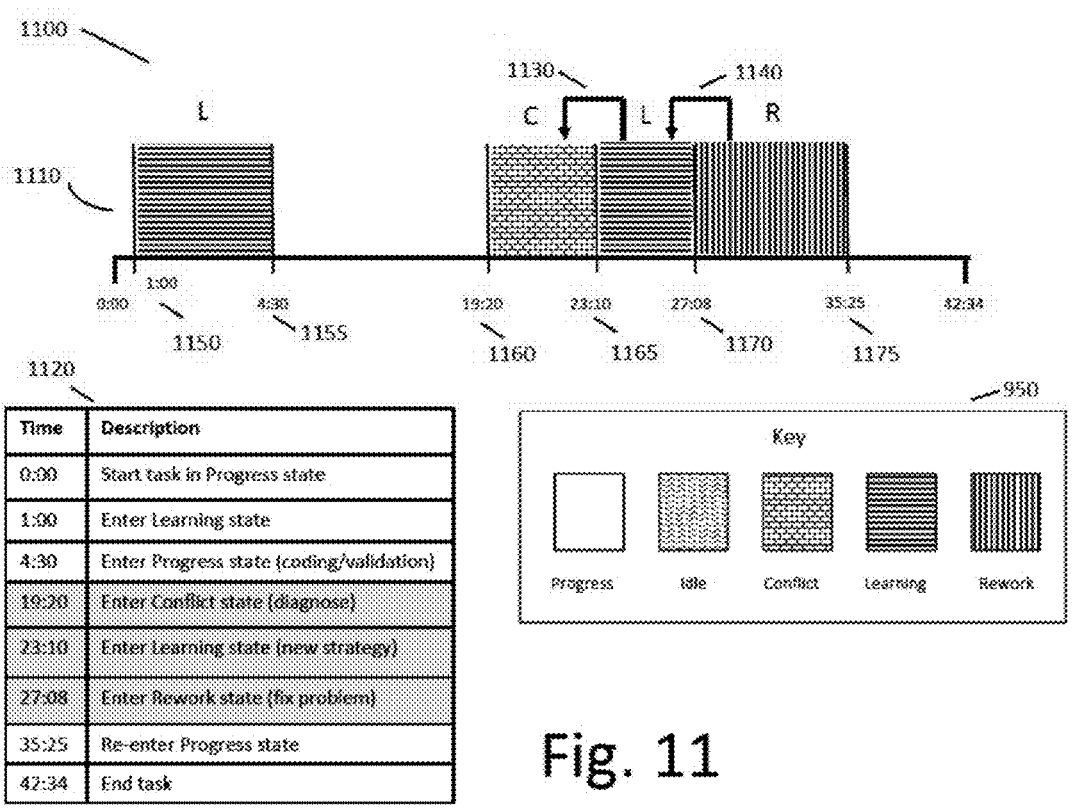
FIG. 11 shows a timeline with linked states.

FIG. 11 depicts a task 1100 that contains a Conflict Loop [270] as defined in FIG. 2. Timeline [1110] and table [1120] record the work session. A developer begins a task in the Progress state then switches to the Learning state at time 1:00 (1150). The Progress state is re-entered at time 4:30 (1155) in which coding and validation occur. At time 19:20 (1160), however, the application exhibits an unexpected characteristic or behavior that causes the developer to press the Conflict button. The developer diagnoses the problem while in the Conflict state. At time 23:10 (1165), the developer begins to research a solution and presses the Learning button to enter the Learning state. Research is completed at time 27:08 (1170) when the developer begins to fix the problem. At time 35:25 (1175), the problem is fixed, the rework button is depressed, and the Progress state ensues until task completion.

An important aspect of timeline [1110] is the automatic linkage between states in the Conflict Loop. At time 19:20 (1160), the developer presses the Conflict button and transitions from GUI configuration [810] to [820] as shown in FIG. 8. When the developer presses the Learning button at time 23:10 (1165), the UI configuration transitions from [820] to [830]. (Note that the relabeling of the C button to $C^L$ is not shown in FIG. 11.) When this transition occurs, the Idea Flow Engine [120] automatically links (1130) the Learning time interval to the preceding Conflict time interval.

Similarly, when the developer presses the Rework button at time 27:08 (1170), the UI configuration transitions from [830] to [840]. (Note that the relabeling of the $C^L$ button to $C^R$ is not shown in FIG. 11.) When this transition occurs, the Idea Flow Engine [120] automatically links (1140) the Rework time interval to the preceding Learning time interval.

Figure 12:
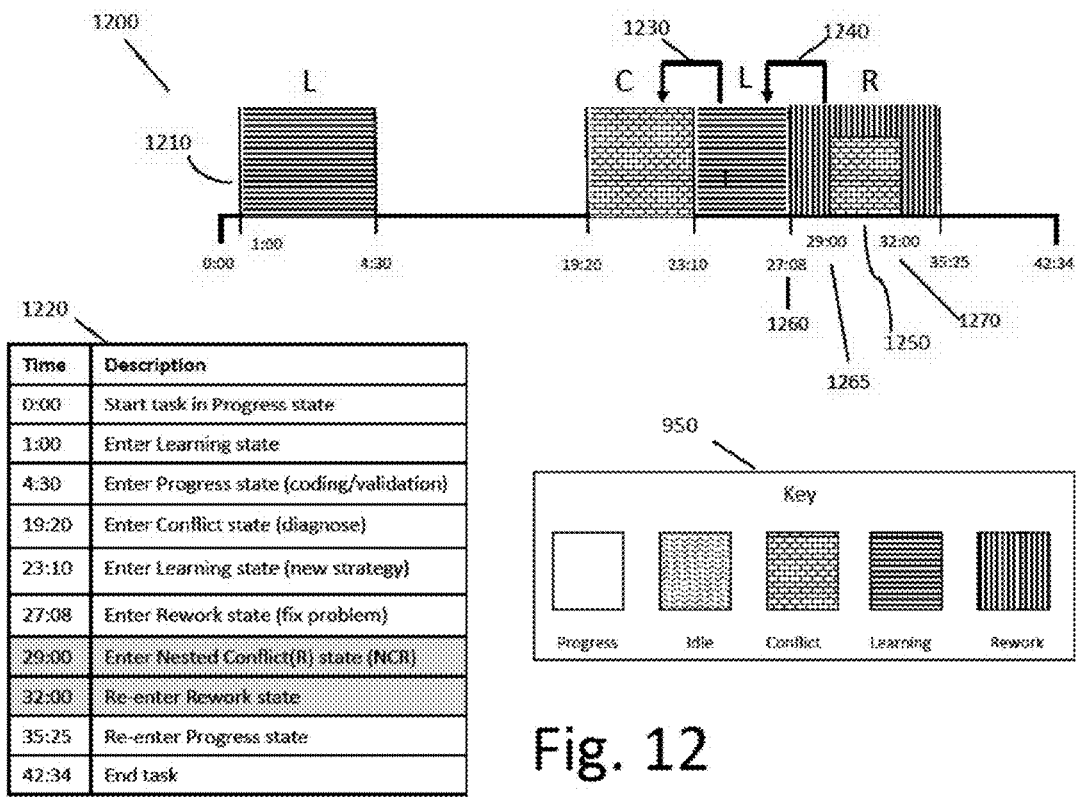
FIG. 12 shows a timeline with a nested state.

FIG. 12 depicts a task 1200 that contains a Conflict Loop [270] with a nested Conflict state. Timeline [1210] and table

[1220] record the work session. The task proceeds in the exact same manner as the task in FIG. 11 until time 27:08 (1260) when Rework state is entered. Rework proceeds until time 29:00 (1265), when the developer encounters another unexpected characteristic or behavior. At this point, the developer presses the $C^R$ button to enter Conflict state 1250 and transition from UI configuration [840] to [860]. At time 32:00 (1270), the second problem is fixed and the original rework continues again under UI configuration [840]. The task completes as in FIG. 11.

Those versed in the art will understand that the representation of timelines, including how linking and nesting are displayed in a GUI, can take many forms. These many possible representations do not substantively affect the claims of this invention.

Figure 13:
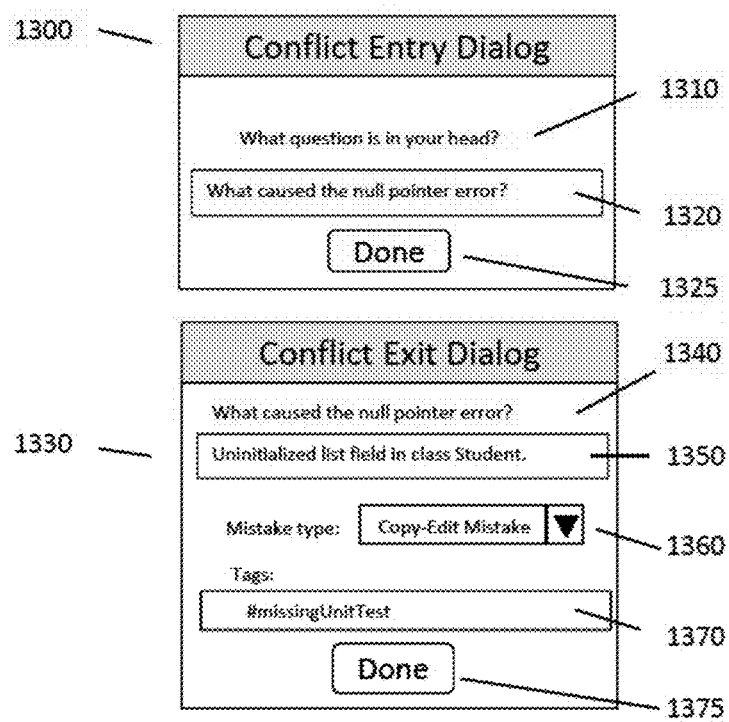
FIG. 13 shows how annotations can be interactively associated with time intervals.

FIG. 13 illustrates how the Idea Flow Engine [120] can be integrated into an interactive application or computing environment. In an embodiment, Conflict Entry Dialog [1300] is displayed in a graphical user interface whenever the user presses the Conflict button. The dialog asks the user to document the main question [1310] that prompted the conflict. The user answers by filling in text field [1320] and then pressing the Done button [1325].

FIG. 13 also shows Conflict Exit Dialog [1330] that embodiments display when the user exits a Conflict state. The user in now asked to answer that question [1340] that was previously entered in Conflict Entry Dialog [1300]. The response is entered in text field [1350]. The user can also assign a mistake type to the problem using drop-down list [1360]. In addition, the user can annotate the Conflict with custom or pre-defined hash tags by entering them in text box [1370]. Pressing the Done button [1375] closes the dialog.

FIG. 14 shows Conflict Details window [1400] as implemented in an embodiment. The embodiment provides a way for users to select points or intervals of time on a task's timeline. Once a selection is made, the user can view all information associated with that time and its state. As an example, FIG. 14 shows what question caused the user to enter a Conflict state [1410], what caused the problem [1420], what mistake type was assigned to the problem [1430], how was the problem resolved [1440], how long the conflict lasted [1450], and the annotation associated with the Conflict [1460]. Pressing the Done button [1470] closes the window.

Those experienced in the art will recognize that the graphical user interfaces shown in FIGS. 13 and 14 are merely illustrative examples of possible user interfaces. Embodiments can implement user interfaces using a wide variety of technologies and modalities, including all types of visual, tactile, audio, voice activated, and handwriting recognition technologies. Embodiments include taxonomies of key/value pairs (such as mistake type [1360, 1430]) and hash tags (not shown) so that users can quickly and conveniently associate information with states and time periods. Generally speaking, users should be able to augment timelines with any type of information that aids the analysis and understanding of how time was spent.

In particular, embodiments allow users to group together multiple time intervals and to associate with that grouping a name and other descriptive information. This grouping capability, along with ways to visualize groups, allows users to record meaningful associations between task activities.

FIGS. 15-20 display states in timeline representation as recorded by users when they are programming. Referring to FIG. 1, this state information is part of the Annotated Timeline Data [130] produced by the Idea Flow Engine [120]. The Analytics Engine [150] processes the timeline data to yield insight into developer experience. Understanding how developers spend their time, both on the same project and across projects, can illuminate the causes of inefficiencies in the development lifecycle and, ultimately, reduce the cost of producing quality software.

The Analytics Engine [150] discovers patterns in developer activity by examining the frequency, number, type and duration of time intervals reported by developers. When taken together, these time intervals define a time series data set. With reference to FIGS. 15-20, those knowledgeable in the art of software development can use standard techniques to detect and report patterns in time series data.

Figure 15:
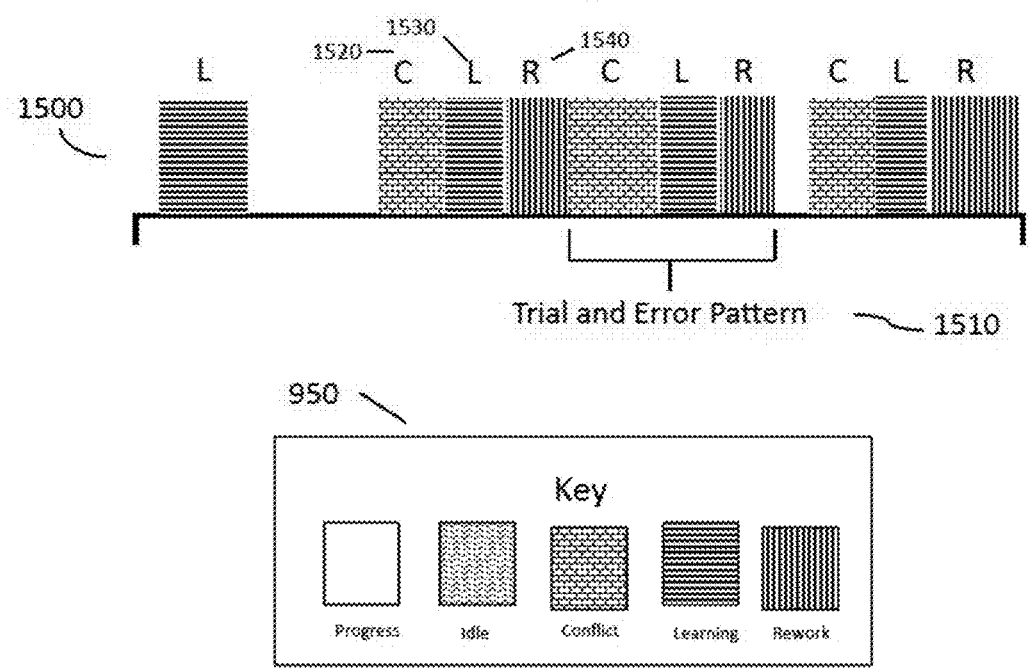
FIG. 15 shows a timeline exhibiting a Trial and Error Pattern.

FIG. 15 illustrates an exemplary Trial and Error pattern [1510] of state transitions and intervals in timeline [1500]. In this pattern, a developer encounters an unexpected characteristic or behavior and then repeatedly tries different approaches and implementations to resolve the problem. The distinguishing characteristic of this pattern is the multiple Conflict states (1520) in close temporal proximity, each followed by a Learning state (1530), a Rework state (1540), or both a Learning and Rework state (as shown).

The Trial and Error Pattern [1510] suggests one of several causes, including the difficulty of fitting a feature into the existing design, inadequate requirements, modeling mistakes, or possibly just an indecisive developer on a quest for perfection. These varied causes are all rooted in bad strategy assumptions that require multiple refactorings (i.e., Rework states) and/or multiple trips "back to the drawing board" (i.e., back to the Learning state).

Figure 16:
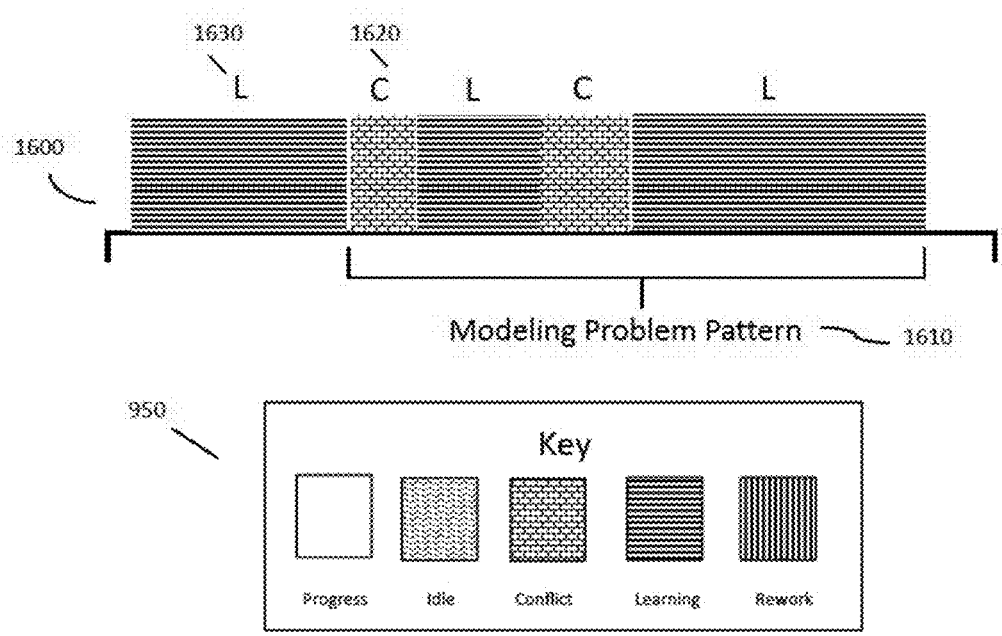
FIG. 16 shows a timeline exhibiting a Modeling Problem Pattern.

FIG. 16 illustrates an exemplary Modeling Problem pattern [1610] of state transitions and intervals in timeline [1600]. In this pattern, a developer repeatedly encounters an unexpected characteristic or behavior that requires a significant amount of time to explore alternative approaches. The distinguishing characteristic of this pattern is the multiple Conflict states (1620) in close temporal proximity, each followed by a significant amount of time in a Learning state (1630).

The Modeling Problem Pattern [1610] indicates that a developer is having a hard time building a conceptual model for how the system works. The causes of modeling problems include poorly designed code, diversity in developer thinking styles, or a lack of familiarity with the code base.

Figure 17:
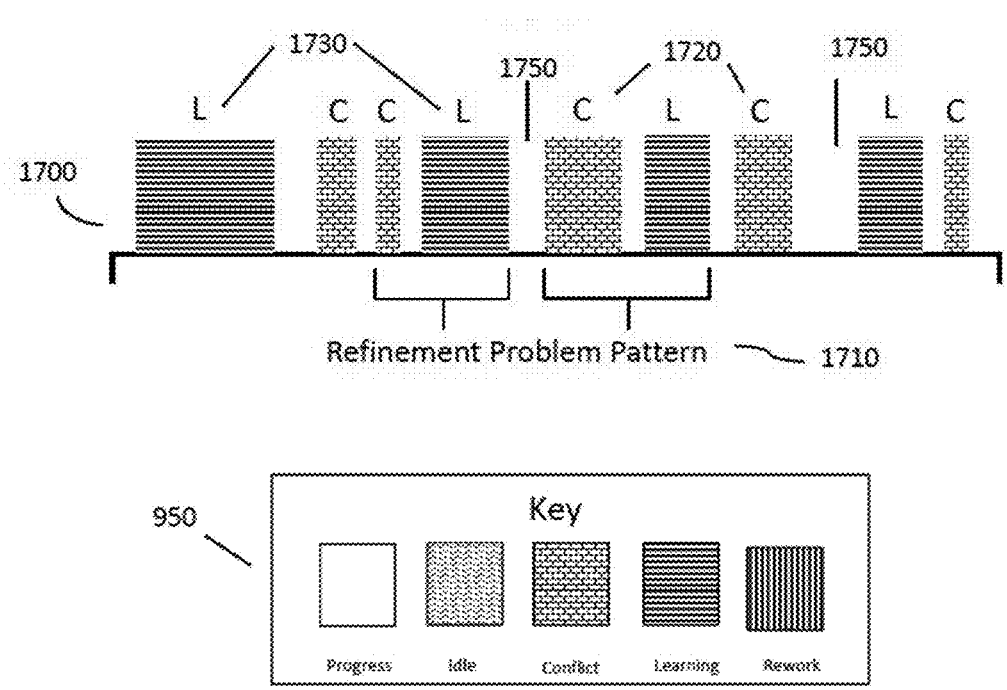
FIG. 17 shows a timeline exhibiting a Refinement Problem Pattern.

FIG. 17 illustrates an exemplary Refinement Problem pattern [1710] of state transitions and intervals in timeline [1700]. In this pattern, a developer repeatedly encounters an unexpected characteristic or behavior after periods of Progress or Learning. The distinguishing characteristic of this pattern is multiple Conflict states (1720) in close temporal proximity, often of relatively short duration, followed by similarly short Progress states (1750) and occasional Learning states (1730) of varying duration.

The Refinement Problem Pattern [1710] indicates that a developer is experiencing difficulty with complex details. This results in increased time spent learning and troubleshooting and a higher frequency of mistakes. Refinement problems are typically caused by factors such as complex business rules, complex algorithms, a complex input space, or numerous application states to consider (particularly in multi-threaded applications).

Figure 18:
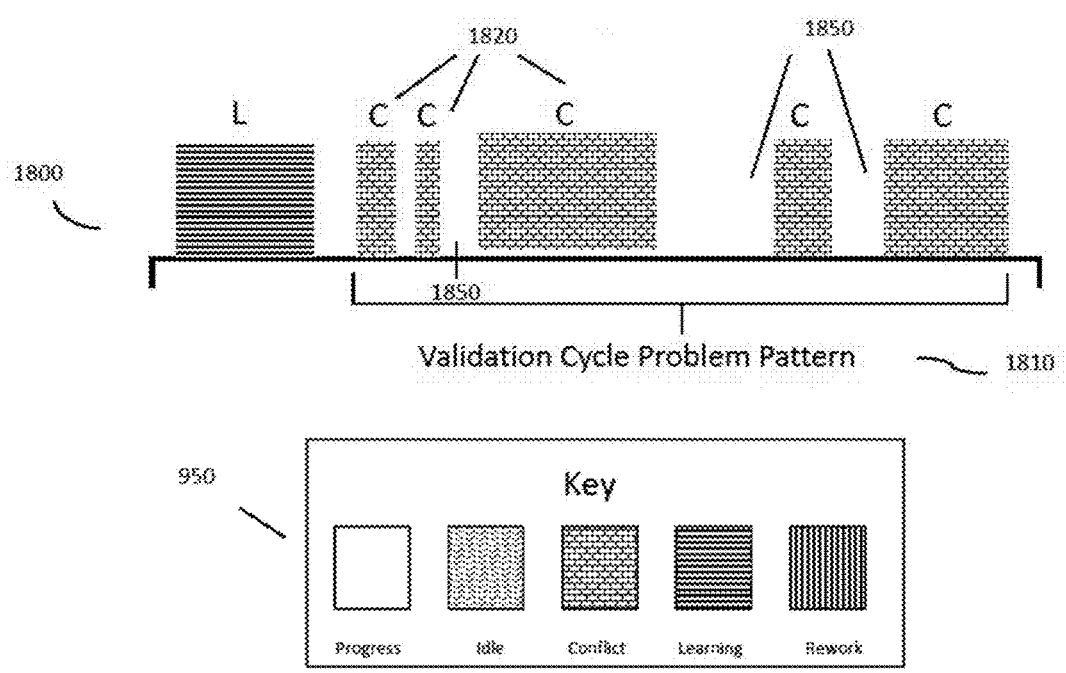
FIG. 18 shows a timeline exhibiting a Validation Cycle Problem Pattern.

FIG. 18, illustrates an exemplary Validation Cycle Problem pattern [1810] of state transitions and intervals in timeline [1800]. In this pattern, a developer repeatedly encounters an unexpected characteristic or behavior as she is trying to validate her work and make progress. The distinguishing characteristic of this pattern is multiple Conflict states (1820) in close temporal proximity and of varied duration, each followed by a short Progress state (1850).

The Validation Cycle Problem Pattern [1810] indicates that a developer is experiencing difficulty in validating her code. This results in numerous, piecemeal attempts at troubleshooting as she alternates between Conflict and Progress states. Validation Cycle problems are typically caused by factors such as design problems that make experiments difficult or slow to run or analyze, experiments that yield inconclusive results, inadequate diagnostic tools, or poor troubleshooting techniques.

Figure 19:
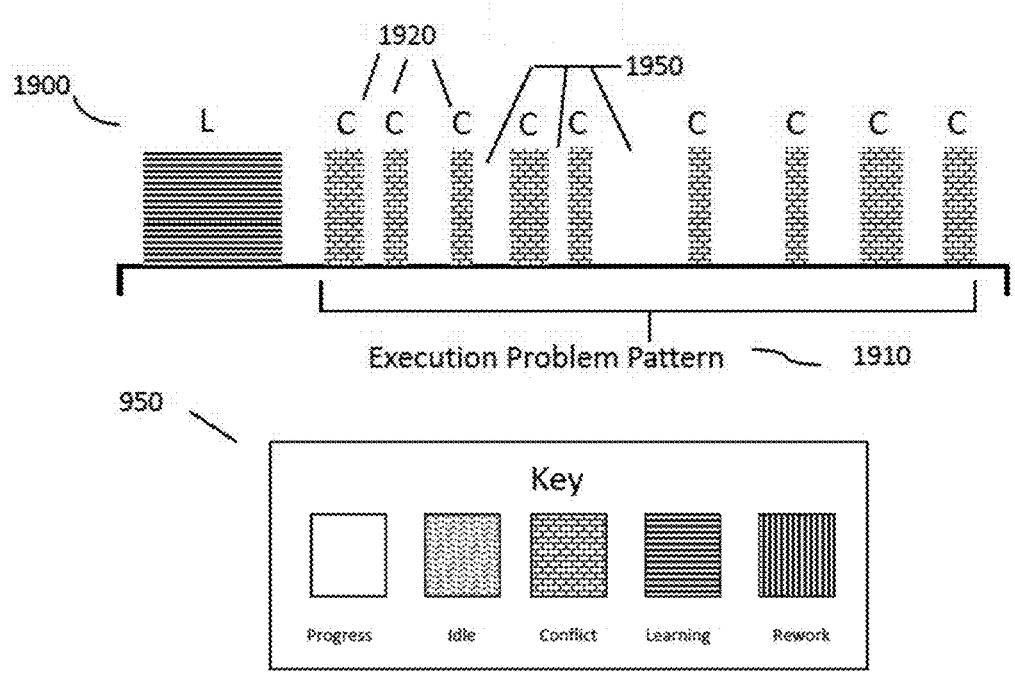
FIG. 19 shows a timeline exhibiting an Execution Problem Pattern.

FIG. 19 illustrates an Execution Problem pattern [1910] of state transitions and intervals in timeline [1900]. In this pattern, a developer repeatedly encounters an unexpected characteristic or behavior while trying to make incremental changes to a program. The distinguishing characteristic of this pattern is the frequent, short Conflict states (1920) in close temporal proximity, each followed by a Progress state (1950).

The Execution Problem Pattern [1610] indicates that a developer is having difficulty changing the behavior of code. This results in many short Conflict states, each representing the failure of a small change to deliver its desired effect. The causes of execution problems include brittle dependencies in the code, copy/paste errors, a lack of tool support, or a lack of proficiency in the language.

Embodiments of the invention are implemented with or on a computer system. Exemplary computer systems are illustrated in FIGS. 20a, 20b, and 21.

FIG. 20a illustrates an exemplary computer system 2000 in desktop computer 2015, with display monitor 2010, keyboard 2020, and mouse 2025. Also depicted are smart phone 2030 and tablet computer 2035. Desktop computer 2015, smart phone 2030, and tablet computer 2035 are examples of a computer system. Display monitor 2010, and smart phone 2030 and tablet computer 2035, including their display screen and graphic display drivers, are examples of a display device. Keyboard 2020 and mouse 2025, smart phone 2030, and tablet computer 2035, are examples of an input device. Exemplary graphic user interfaces 2040, 2042, and 2046 for input and display of one or more of state selection, tracking, state selection data, annotations, and software development data are shown in display monitor 2010, smart phone 2030, and tablet computer 2035, respectively.

Also depicted in FIG. 20a is an optional hardware-implemented accessory 2026 having a housing 2027 and physical push-buttons 2029. Push-buttons 2029 may be colored or may include colored lights to indicate the state. Hardware-implemented accessory 2026 is depicted with a wired communication link 2028 to computer system 2000, for example, USB or other serial link. Alternatively, accessory 2026 may be coupled to computer system 2000 via a wireless connection, for example, Bluetooth, Wi-Fi, or infrared (not shown). Although not depicted here, accessory 2026 may include an internal computer system comprising processor, clock, memory, and serial bus or communications port, for tracking and locally recording time data for each state, and communicating time data and, optionally, other data (which may include other data input into the accessory or timeline data) to another computer system.

FIG. 20b illustrates an exemplary computer system 2050 in desktop computer 2065, with display monitor 2060, keyboard 2070, and mouse 2075. Also depicted are smart phone 2080 and tablet computer 2085. Desktop computer 2065, smart phone 2080, and tablet computer 2085 are examples of a computer system. Display monitor 2060, and smart phone 2080 and tablet computer 2085, including their display screen and graphic display drivers, are examples of a display device. Exemplary graphic user interfaces 2090, 2092, and 2096 for displaying one or more of timeline data, annotations, software development data, and annotated timeline data graphics are shown in display monitor 2060, smart phone 2080, and tablet computer 2085, respectively.

FIG. 21 is a block diagram illustrating exemplary components of a computer system 2100 that includes one or more processors (or central processing units) 2110 operatively coupled to one or more memory units 2130 and one or more data stores (or secondary storage devices) 2123, 2127, 2125.

The one or more data stores (or secondary storage devices) and memory units provide sufficient capacity to store data and program instructions to implement the methods, systems, apparatuses, and diagnostic tools described herein. The memory units 2130 may include any form of memory, including RAM, flash memory, USB drives, ROM, or similar types of memory. Exemplary data stores or secondary storage devices include disk 2120, controller solid-state drive 2127, hard disk drive 2125, floppy disk drive (not shown), optical drive, CD-ROM or DVD 2123, or other types of non-volatile data storage (not depicted). A data store may also include internet-accessible "cloud" storage or other remote computers or servers (not shown) operatively coupled to computer system 2100.

One or more processors 2110 may be operatively coupled to one or more memory units 2130 and other components of the computer system by a system bus 2105. The computer system may include or be coupled to a network interface device/communications port 2140 to connect to one or more networks. One or more processors 2110 may be coupled to one or more processors or memory units 2130 over a network connection, including a local area network, a wide area network, the Internet, the World Wide Web, Wi-Fi data network, Bluetooth or other radio connection, a wireless data network, a cellular data network, or any other form of network connection that can link one or more computers or computer systems. Thus, any "coupling" of computer system components described herein comprises close or local coupling, e.g., via a system bus, wired coupling (e.g., USB connection, Ethernet), wireless coupling (Wi-Fi connection or Bluetooth), and/or remote coupling, e.g., via a network or Web connection (not shown).

Computer system 2100 includes or is operatively coupled to a clock or other device capable of measuring and reporting elapsed time, including but not limited to the system clock 2115 integrated with processor 2110, a software-implemented timer application, timer or clock provided by another device, including a smart phone or tablet computer, or a timer accessory 2175 that is coupled to the computer system (e.g., hardware-implemented accessory 2026).

The computer system may include or be operatively coupled to one or more input devices, display devices, output devices, or other I/O devices.

An input device may include any device or combination of hardware and software adapted for entering information into a computer system, and exemplary input devices include input/output interface 2160, keyboard 2170, mouse 2165, and other exemplary input devices not shown in FIG. 21, including touch-screen, touch-pad, key-pad, capacitive screen, trackpad or cursor-control device, camera, infrared sensor, a handwriting-recognition system, and a microphone operatively coupled to a speech-recognition system. An embodiment may use hardware-implemented accessory 2026 or other a special-purpose timer or multi-button structure coupled to a computer system or including elements of a computer system. The input device in an embodiment includes any input device or systems provided by telephone, a smart phone, or tablet computer. An input device may be a combination of hardware and software such as a Web browser. The input device may be used to enter information into GUIs during performance of the methods described above.

An exemplary display device may include any type of device for presenting visual information such as, for example, a computer display monitor 2155, flat-screen display, or mobile device screen, and display interface 2150. A display device may be a combination of hardware and software, such as, for example, a Web browser. The display device may display information in a GUI during performance of the methods described above.

Other exemplary output devices may include any type of device for presenting, storing, or fixing in a tangible medium, such as a printer, and other types of output devices include speakers or any device for providing information in audio form. Another form of output device is a driver, for example a software driver that organizes graphic data in a specified format for storage in memory or on a data store. Exemplary formats include HTML, PDF, JPB, BMP, TIFF, and similar formats for the storage and display of graphic information. Without limitation, the time data, annotated timeline data, and software development data described herein can be input, output, recorded, stored, displayed, or produced in any medium or format known to those of skill in the art.

The computer system or computer systems may execute one or more software applications and/or system software to implement, execute and perform the state machine, steps, methods, algorithms, and functions described herein. The one or more software applications may include stand-alone applications, an IDE, a Software Development Platform, or one or more individual components of a Software Development Platform. Time data, annotated timeline data, and software development data, may be recorded or stored in a database or DBMS. The software applications and/or system software include program instructions which when stored in memory can be executed by one or more processors to perform the steps, methods, and functions and implement the diagnostic tool, systems and apparatus described above and illustrated in the Figures herein.

Those of skill will recognize that the techniques of the embodiments described herein may be implemented to advantage in a variety of sequential orders and that the present invention may be generally implemented in memory or other storage media for introduction into a computer system adapted for performing the steps, functions, and methods described herein.

The computer system may be a single desktop or personal computer, or it may be a server computer, laptop computers, notebook computers, palm top computers, network computers, smart phone, tablet, or other mobile device, or any processor-controlled device capable of performing the steps, methods, and functions described herein. The computer system may be implemented using other computer architectures (for example, a client/server type architecture, a mainframe system with terminals, an ASP model, a peer to peer model, and the like) and other networks (for example, a local area network, the internet, a telephone network, a wireless network, a mobile phone network, and the like), and those other implementations are within the scope of the invention since the invention is not limited to any particular computer architecture or network.

Alternative embodiments include a method of improving the efficiency of software development, for use with a software development platform comprising a processor, a memory, a clock, data store, an input device, a display device, and a software development sensor, comprising: providing the software development sensor with a software development task, a plurality of states associated with the software development task, a plurality of software development activities associated with the software development task, and an association of each of the plurality of states with one or more of the plurality of software development activities; tracking, with the software development sensor, the software development activities over time, including the time spent in each of the plurality of software development activities; storing sensor data associated with the software developer activities, wherein sensor data associated with the software developer activities comprises time interval data associated with each of the software development activities; formatting the sensor data in a graphic display format; and displaying the formatted sensor data on the display device or storing it on the data store. Other embodiments of this method include one or more of the following features: extracting efficiency information from the sensor data; each of the plurality of states is associated with a time interval, changes in accordance with transitions defined in a state machine, can be linked to other states, and can be nested within other states; tracking, with the software development sensor, the software development activities over time, further comprises collecting data automatically about the development environment and associating said automatically-collected data with at least one of a time interval, a state, or a software development activity; formatting the sensor data in a graphic display format further comprises retrieving sensor data, decoding sensor data state, and producing one or more views of the sensor data; the plurality of states comprise states corresponding to progress, learning, troubleshooting, and rework; annotating a time interval; the graphic display format comprises a time series graph; the graphic display format comprises an annotated time series graph; and each of the plurality of states is associated with a unique color, and wherein the graphic display format comprises a color-coded time series graph.

Another alternative embodiment is a method of improving the efficiency of software development, for use with a software development platform comprising a processor, a memory, a clock, data store, an input device, a display device, and a software development sensor, comprising: providing the software development sensor with a software development task and a plurality of states comprising states corresponding to progress, learning, troubleshooting, and rework, each state associated with a unique color; tracking, with the software development sensor, the time spent in each state; storing sensor data, including time interval data associated with each state, and annotations associated with each time interval; formatting the sensor data into a color-coded annotated time series graph format; and displaying the color-coded annotated time series graph format on the display device or saving it to the state store. Other embodiments of this invention include one or more of the following features: extracting efficiency information from the sensor data; extracting efficiency information from the sensor data comprises performing at least one of the following steps: retrieving sensor data, decoding sensor data, decoding sensor data state, finding one or more patterns in the sensor data, quantifying said patterns with respect to time expended in one or more software development activities, identifying patterns associated with inefficient use of developer time, identifying root causes of inefficient use of developer time; correlating patterns between different sets of sensor data, or outputting root cause and correlation information; and the "at least one of the following steps" is performed automatically by the software development platform.

Another alternative embodiment is a software development sensor system, comprising: a software development sensor comprising a processor, and a clock; a memory coupled to the processor, wherein the memory is adapted to store program instructions and data representing a software development task, a plurality of states associated with the software development task, a plurality of software development activities associated with the software development task, and an association of each of the plurality of states with one or more of the plurality of software development activities; and a data store coupled to the software development sensor, wherein the memory of the software development sensor comprises program instructions which when executed by the processor cause the software development sensor to perform the following: track the software development activities over time, including the time spent in each of the plurality of software development activities; store in the data store sensor data associated with the software developer activities, wherein sensor data associated with the software developer activities comprises time interval data associated with each of the software development activities; and format the sensor data in a graphic display format. Another embodiment of this invention comprises a visualization engine coupled to the software development sensor, the visualization engine comprising a visualization processor and a visualization memory, and the visualization engine coupled to a display device and the data store, wherein the visualization memory comprises instructions which when executed by the visualization processor cause the visualization engine to format the sensor data in a graphic display format and display the formatted sensor date to the display device or store it on the data store.

Another alternative embodiment is a method of processing developer activity in a software development environment in which the developer can create, edit, modify, and delete software artifacts and source code, the method comprising: tracking the developer's activity at any point in time, wherein tracking includes associating a state with every activity the developer performs, wherein the state associates with a time interval, changes in accordance with transitions defined in a state machine, can be linked to other states, and can be nested inside other states, collecting data automatically about the development environment; associating said automatically collected data with a time interval and state; outputting sensor data; displaying sensor information in a graphical format, wherein visualization includes: retrieving sensor data, decoding sensor data state, and presenting multiple views of sensor data; and analyzing sensor data, comprising retrieving sensor data, decoding sensor data, finding patterns in the sensor data, quantifying said patterns with regard to time expended in various activities, identifying patterns that indicate inefficient use of developer time, discovering the root causes of inefficient uses of developer time, correlating patterns between different sets of sensor data, and outputting root cause and correlation information.

Although this disclosure teaches diagnostic tools, apparatuses, systems, and methods that are adapted to solving problems arising in the fields of software engineering, including improving the efficiency of software development, the teachings and insights disclosed herein can be extended and adapted to improving the efficiency of processes for solving technical problems in other fields of engineering, science, manufacturing, or other practical art, including any field in which problem-solving processes include phases of learning, trouble-shooting, and reworking.

An embodiment of a computer-implemented problem-solving diagnostic tool comprises: a computer system comprising a processor operatively coupled to memory, a data store, and a clock, the computer system operatively coupled to at least one input device, wherein the memory comprises program instructions which when executed by the processor cause the computer system to: implement a problem-solving state machine comprising a plurality of states of problem-solving activity, said plurality of states comprising at least three predefined states of problem-solving activity, the three predefined states comprising a learning state, a troubleshooting state, and a reworking state; receive state selection information, comprising selection or deselection of states of problem-solving activity; display state selection information; record, in memory or the data store, problem-solving data, wherein said problem-solving data comprises, for each of the plurality of states of problem-solving activity, time data for each time interval when the state has been selected; and produce annotated timeline data, wherein said annotated timeline data comprises a timeline of the states of problem-solving activity.

An embodiment of a method of collecting problem-solving diagnostic data comprises activating a computer-implemented problem-solving diagnostic tool; initiating a problem-solving task, wherein the problem-solving task comprises at least three types of problem-solving activities, including learning activity, troubleshooting activity, and reworking activity; selecting states of problem-solving activity of the computer-implemented problem-solving diagnostic tool, comprising: upon beginning or resuming a learning activity, selecting the learning state; upon beginning or resuming a troubleshooting activity, selecting the troubleshooting state; and upon beginning or resuming a reworking activity, selecting the reworking state, wherein selecting a state causes the computer-implemented problem-solving diagnostic tool to begin tracking the time spent in said state; and ending the problem-solving task in the computer-implemented problem-solving diagnostic tool. An embodiment of a method of detecting inefficiencies in problem-solving comprises producing diagnostic data comprising annotated timeline data, comprising using a computer-implemented problem-solving diagnostic tool; displaying the diagnostic data in a graphic format on a display device operatively coupled to the computer-implemented problem-solving diagnostic tool; and detecting in the diagnostic data a problem pattern of problem-solving activity.

The terms and descriptions used herein are set forth by way of illustration only and are not meant as limitations. Those skilled in the art will recognize that many variations are possible with the spirit and scope of the invention as defined in the following claims, and their equivalents. The described embodiments illustrate the scope of the claims but do not restrict the scope of the claims.

What is claimed is:

1. A computer-implemented software development diagnostic tool for improving the efficiency of software development, comprising:

a computer system comprising a processor operatively coupled to memory, a data store, and a clock, the computer system operatively coupled to at least one input device, wherein the memory comprises program instructions which when executed by the processor cause the computer system to:

implement a software development state machine comprising a plurality of states of software development activity, said plurality of states comprising at least three predefined states of software development activity, the three predefined states comprising a learning state, a troubleshooting state, and a reworking state, and wherein the software development state machine further includes an idle state and a progress state;

receive state selection information, comprising selection or deselection of states of software development activity, from a user via the input device;

display state selection information;

record, in memory or the data store, software development data, wherein said software development data comprises, for each of the plurality of states of software development activity, time data for each time interval when the state has been selected, wherein time data for each time interval when the state has been selected includes start and stop times for each time interval automatically recorded using the clock; and produce annotated timeline data, wherein said annotated timeline data comprises a timeline of the states of software development activity.

2. The computer-implemented software development diagnostic tool of claim 1, wherein the diagnostic tool is integrated with an integrated development environment or a Software Development Platform.

3. The computer-implemented software development diagnostic tool of claim 1, wherein selection or deselection of states of software development activity further comprises selection of state selection buttons displayed via a graphical user interface on a display device operatively coupled to the computer system.

4. The computer-implemented software development diagnostic tool of claim 1, wherein the memory further comprises program instructions which when executed by the processor cause the computer system to display, on a display device operatively coupled to the computer system, annotated timeline data graphics.

5. The computer-implemented software development diagnostic tool of claim 1, wherein the memory further comprises program instructions which when executed by the processor cause the computer system to correlate timeline data with software development data.

6. The computer-implemented software development diagnostic tool of claim 5, wherein the software development data comprises annotation information received via the input device, the annotation information comprising annotations regarding at least one of a software development task, a software development state, a software development activity, a time interval, or a mistake.

7. The computer-implemented software development diagnostic tool of claim 5, wherein software development data comprises development environment data, wherein development environment data comprises at least one of: which files were viewed or modified during development, which areas of code were tested and the results of those tests, how much time a developer spent viewing, modifying, or testing code during any time period, commitment of code to a source code repository, testing history, and deployment history.

8. The computer-implemented software development diagnostic tool of claim 5, wherein software development data further comprises data aggregated from multiple developer experiences.

9. The computer-implemented software development diagnostic tool of claim 5, wherein software development data further comprises data aggregated from multiple developer experiences comprising at least one of similar tag names, similar tasks, similar areas of code, and similar patterns of mistakes.

10. The computer-implemented software development diagnostic tool of claim 1, wherein the input device comprises at least one of the following: a display device comprising a graphical user interface adapted and configured to display one or more state selection options, a touchscreen, a keyboard, a mouse, trackpad, or cursor control device, or an accessory operationally coupled to the computer system, said accessory comprising a housing and one or more buttons.

11. The computer-implemented software development diagnostic tool of claim 1, wherein software development activity comprises activity performed by a human developer.

12. A method of collecting software development diagnostic data, comprising:

activating a computer-implemented software development diagnostic tool, wherein the computer-implemented software development diagnostic tool comprises:

a computer system operatively coupled to a user input device, the computer system comprising a processor operatively coupled to memory, a data store, and a clock, wherein the memory comprises program instructions which when executed by the processor cause the computer system to:

implement a software development state machine comprising a plurality of states of software development activity, said plurality of states comprising a learning state, a troubleshooting state, and a reworking state;

receive state-selection information;

display state selection information; and record, for each of the plurality of states of software development activity, time data for each time interval when the state has been selected;

initiating a software development task, wherein the software development task comprises at least three types of software development activities, including learning activity, troubleshooting activity, and reworking activity;

selecting states of software development activity of the computer-implemented software development diagnostic tool, wherein selecting states comprises using the user input device, wherein selecting states further comprises:

upon beginning or resuming a learning activity; selecting the learning state, upon beginning or resuming a troubleshooting activity, selecting the troubleshooting state, and upon beginning or resuming a reworking activity, selecting the reworking state, wherein selecting a state causes the computer-implemented software development diagnostic tool to begin tracking the time spent in said state and to record, in memory or the data store, time data for the time interval when the state has been selected.

13. The method of collecting software development diagnostic data of claim 12, further comprising making an annotation in the computer-implemented software development diagnostic tool, wherein the annotation comprises information regarding at least one of a software development task, a software development state, a software development activity, a time interval, or a mistake.

14. The method of collecting software development diagnostic data of claim 12, wherein the computer-implemented software development diagnostic tool produces annotated timeline data.

15. A method of detecting inefficiencies in software development, comprising:
- producing diagnostic data comprising annotated timeline data, wherein producing diagnostic data comprises using a computer-implemented software development diagnostic tool to receive developer selection of software development activity states, said software development activity states comprising a learning state, a troubleshooting state, and a reworking state, and to track software development time spent in each software development state, and wherein annotated timeline data comprises time data for a learning state, a troubleshooting state, and a reworking state;
- displaying the diagnostic data in a graphic format on a display device operatively coupled to the computer-implemented software development diagnostic tool; and
- detecting in the diagnostic data a problem pattern of developer activity.

16. The method of detecting inefficiencies in software development of claim 15, wherein producing diagnostic data further comprises correlating timeline data aggregated from multiple developer experiences.

17. The method of detecting inefficiencies in software development of claim 16, herein timeline data aggregated from multiple developer experiences comprises at least one of similar tag names, similar tasks, similar areas of code, and similar patterns of mistakes.

18. The method of detecting inefficiencies in software development of claim 15, wherein a problem pattern of developer activity comprises at least one of a trial and error pattern, a modeling problem pattern, a refinement problem pattern, a validation cycle problem pattern, and an execution problem pattern.

\* \* \* \* \*